US010066945B2

(12) United States Patent
Aoki

(10) Patent No.: US 10,066,945 B2
(45) Date of Patent: *Sep. 4, 2018

(54) INFORMATION PROCESSING DEVICE, INFORMATION PROCESSING METHOD AND NON-TRANSITORY COMPUTER-READABLE MEDIUM STORING PROGRAM

(71) Applicant: RICOH COMPANY, LTD., Tokyo (JP)

(72) Inventor: Shinji Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,140

(22) Filed: Oct. 20, 2016

(65) Prior Publication Data

US 2017/0038216 A1    Feb. 9, 2017

Related U.S. Application Data

(63) Continuation of application No. 14/455,211, filed on Aug. 8, 2014, now Pat. No. 9,506,762.

(51) Int. Cl.
*G01C 21/20* (2006.01)
(52) U.S. Cl.
CPC ................... *G01C 21/206* (2013.01)
(58) Field of Classification Search
CPC .................................................. G01C 21/206
See application file for complete search history.

(56) References Cited

U.S. PATENT DOCUMENTS 7,948,437 B2 * 5/2011 Torimoto ............... G01C 21/12
   342/357.31
8,280,398 B2 * 10/2012 Ishii ......................... G01S 1/70
   340/539.13
(Continued)

FOREIGN PATENT DOCUMENTS

JP        09-126804        5/1997
JP       2002-005682 A     1/2002
(Continued)

OTHER PUBLICATIONS

Japan Aerospace Exploration Agency (JAXA), "Quasi-Zenith Satellite System Navigation Service Interface Specification for QZSS (IS-QZSS) V1.4", Feb. 28, 2012.

(Continued)

*Primary Examiner* — Mussa A Shaawat
(74) *Attorney, Agent, or Firm* — Oblon, McClelland, Maier & Neustadt, L.L.P.

(57) ABSTRACT

An information processing device can receive a positioning signal that is transmitted from a transmitting device. The information processing device includes an input reception unit for receiving an input of a destination and for identifying first location information including fir floor number information, the first floor number information indicating a floor number of the destination in a structure including the destination, a retrieval unit for retrieving second location information including second floor number information from the positioning signal, the second floor number information indicating a floor number on which the transmitting device is provided in a structure in which the transmitting device is provided, and a calculation unit for calculating a route from a current location of the information processing device to the destination by using the first location information and the second location information.

8 Claims, 22 Drawing Sheets

(56) References Cited

U.S. PATENT DOCUMENTS

| | | | | |
|---|---|---|---|---|
| 9,204,257 B1* | 12/2015 | Mendelson | | G08G 1/14 |
| 2007/0001904 A1* | 1/2007 | Mendelson | | G01C 21/206 |
| | | | | 342/450 |
| 2008/0109164 A1* | 5/2008 | Matsunaga | | G01C 21/3647 |
| | | | | 701/431 |
| 2010/0021013 A1* | 1/2010 | Gale | | G01C 21/20 |
| | | | | 382/113 |
| 2012/0143495 A1* | 6/2012 | Dantu | | G01C 21/206 |
| | | | | 701/428 |
| 2013/0169685 A1* | 7/2013 | Lynch | | G01C 21/3635 |
| | | | | 345/634 |
| 2013/0169688 A1 | 7/2013 | Wu | | |
| 2013/0234893 A1* | 9/2013 | Kusakari | | G01S 1/08 |
| | | | | 342/386 |
| 2013/0244697 A1* | 9/2013 | Kusakari | | H04W 4/04 |
| | | | | 455/456.2 |
| 2013/0316729 A1* | 11/2013 | Ohashi | | H04W 4/02 |
| | | | | 455/456.1 |
| 2013/0324153 A1* | 12/2013 | Miyawaki | | H04W 64/00 |
| | | | | 455/456.1 |
| 2013/0342399 A1* | 12/2013 | Fukuda | | G01S 1/02 |
| | | | | 342/386 |
| 2014/0004879 A1* | 1/2014 | Matsushita | | H04W 4/02 |
| | | | | 455/456.1 |
| 2014/0087710 A1* | 3/2014 | Kusakari | | H04W 64/006 |
| | | | | 455/418 |
| 2014/0087766 A1* | 3/2014 | Kusakari | | H04W 4/043 |
| | | | | 455/456.6 |
| 2014/0087767 A1* | 3/2014 | Kusakari | | H04W 4/043 |
| | | | | 455/456.6 |
| 2014/0087768 A1* | 3/2014 | Kusakari | | H04W 4/043 |
| | | | | 455/456.6 |
| 2014/0343846 A1* | 11/2014 | Goldman | | G05D 1/0272 |
| | | | | 701/525 |

FOREIGN PATENT DOCUMENTS

| | | |
|---|---|---|
| JP | 2005-158007 | 6/2005 |
| JP | 2008-023084 A | 1/2006 |
| JP | 4296302 | 7/2009 |
| JP | 2011-215118 | 10/2011 |
| JP | 2012-098077 A | 5/2012 |
| JP | WO2005/086375 A1 | 9/2015 |

OTHER PUBLICATIONS

Office Action issued in Japanese Patent Application No. 2014-152726 dated May 15, 2018, citing documents AO-AQ, 3 pages.

* cited by examiner

FIG.10

| NAME OF DESTINATION | LATITUDE | LONGITUDE | FLOOR |
|---|---|---|---|
| SHOP A IN NORTH BUILDING | 35.66665 | 139.76515 | 3 |
| SHOP B IN SOUTH BUILDING | 35.66615 | 139.76515 | 1 |
| ⋮ | ⋮ | ⋮ | ⋮ |

FIG.11

| LATITUDE | LONGITUDE | FLOOR | RECEIVING DATE AND TIME |
|---|---|---|---|
| ⋮ | ⋮ | ⋮ | ⋮ |
| 35.66615 | 139.76515 | 3 | 2013/4/30 10:00:00 |
| 35.66615 | 139.76515 | 2 | 2013/4/30 10:05:00 |

FIG.12

| IDENTIFYING INFORMATION | DEVICE NAME | OWNER's NAME |
|---|---|---|
| 012345abcdef | SMARTPHONE 1 | A |
| 112345abcdef | TABLET PC 2 | B |
| ⋮ | ⋮ | ⋮ |

FIG.21

| FLOOR CONNECTING PATH | TRAVELING COST |
|---|---|
| STAIRWAY | 20 |
| ELEVATOR | 10 |
| ESCALATOR | 15 |

FIG.22

| NAME | LATITUDE | LONGITUDE |
|---|---|---|
| SOUTH BUILDING, SKYBRIDGE | 35.66655 | 139.76515 |
| NORTH BUILDING, SECOND FLOOR, STAIRWAY | 35.66665 | 139.76525 |
| NORTH BUILDING, SECOND FLOOR, ELEVATOR | 35.66675 | 139.76525 |
| NORTH BUILDING, SECOND FLOOR, ESCALATOR | 35.66675 | 139.76505 |

FIG.23

| NAME | LATITUDE | LONGITUDE |
|---|---|---|
| SHOP A IN NORTH BUILDING | 35.66655 | 139.76515 |
| NORTH BUILDING, THIRD FLOOR, STAIRWAY | 35.66665 | 139.76525 |
| NORTH BUILDING, THIRD FLOOR, ELEVATOR | 35.66675 | 139.76525 |
| NORTH BUILDING, THIRD FLOOR, ESCALATOR | 35.66675 | 139.76505 |

FIG.26

| | | |
|---|---|---|
| ROUTE 1 | ROUTE R1 ON SECOND FLOOR OF SOUTH BUILDING | CURRENT LOCATION – SKYBRIDGE OF NORTH BUILDING |
| | ROUTE R2-1 ON SECOND FLOOR OF NORTH BUILDING | SKYBRIDGE OF SOUTH BUILDING – STAIRWAY OF SECOND FLOOR OF NORTH BUILDING |
| | TO THIRD FLOOR OF NORTH BUILDING BY UTILIZING STAIRWAY OF SECOND FLOOR OF NORTH BUILDING | |
| | ROUTE R3-1 ON THIRD FLOOR OF NORTH BUILDING | STAIRWAY OF THIRD FLOOR OF NORTH BUILDING – DESTINATION |
| ROUTE 2 | ROUTE R1 ON SECOND FLOOR OF SOUTH BUILDING | CURRENT LOCATION – SKYBRIDGE OF NORTH BUILDING |
| | ROUTE R2-2 ON SECOND FLOOR OF NORTH BUILDING | SKYBRIDGE OF SOUTH BUILDING – ELEVATOR OF SECOND FLOOR OF NORTH BUILDING |
| | TO THIRD FLOOR OF NORTH BUILDING BY UTILIZING ELEVATOR OF SECOND FLOOR OF NORTH BUILDING | |
| | ROUTE R3-2 ON THIRD FLOOR OF NORTH BUILDING | ELEVATOR OF THIRD FLOOR OF NORTH BUILDING – DESTINATION |
| ROUTE 3 | ROUTE R1 ON SECOND FLOOR OF SOUTH BUILDING | CURRENT LOCATION – SKYBRIDGE OF NORTH BUILDING |
| | ROUTE R2-3 ON SECOND FLOOR OF NORTH BUILDING | SKYBRIDGE OF SOUTH BUILDING – ESCALATOR OF SECOND FLOOR OF NORTH BUILDING |
| | TO THIRD FLOOR OF NORTH BUILDING BY UTILIZING ESCALATOR OF SECOND FLOOR OF NORTH BUILDING | |
| | ROUTE R3-3 ON THIRD FLOOR OF NORTH BUILDING | ESCALATOR OF THIRD FLOOR OF NORTH BUILDING – DESTINATION |

FIG.27

|  | DISTANCE |
|---|---|
| ROUTE 1 | 0.034 |
| ROUTE 2 | 0.049 |
| ROUTE 3 | 0.049 |

FIG.28

|  | REQUIRED TIME PERIOD |
|---|---|
| ROUTE 1 | 30.6 |
| ROUTE 2 | 44.1 |
| ROUTE 3 | 44.1 |

INFORMATION PROCESSING DEVICE, INFORMATION PROCESSING METHOD AND NON-TRANSITORY COMPUTER-READABLE MEDIUM STORING PROGRAM

CROSS REFERENCE TO RELATED APPLICATIONS

This application is a continuation of U.S. patent application Ser. No. 14/455,211 filed Aug. 8, 2014, the entire contents of which is incorporated herein by reference. U.S. patent application Ser. No. 14/455,211 claims priority to Japanese Patent Application No. 2013-167348 filed Aug. 12, 2013 and Japanese Patent Application No. 2014-152726 filed Jul. 28, 2014, the entire contents of each is incorporated herein by reference.

BACKGROUND OF THE INVENTION

1. Field of the invention

The present invention relates to an information processing device, an information processing method and a non-transitory computer-readable medium storing a program.

2. Description of the Related Art

A navigation system has been known that searches for a route from a departure place to a destination, and that indicates the route. A navigation system may be provided as an automotive navigation system. In addition, a navigation system may be provided as a mobile phone that may always be carried by a user. Such a mobile phone may include a GPS receiver and may be capable of obtaining a current position of the mobile phone. Accordingly, the user may cause the mobile phone to display a route from the current position to a desired place on the display of the mobile phone together with a map. In general, such a route is indicated on a planar map.

Patent Document 1 (Japanese Unexamined Patent Publication No. H09-126804) discloses a technique for displaying a route that spans across a plurality of floors in a building. Here, the route is displayed on a map that is formed by connecting maps corresponding to the plurality of floors. Patent Document 2 (Japanese Unexamined Patent Publication No. 2011-215118) discloses a technique for displaying a moving path that can be traveled both on foot and by transportation means.

Patent Document 3 (Japanese Patent No. 4296302) and Non-Patent Document 1 (Quasi Zenith Satellite System Navigation Service, Interface Specifications for QZSS Ver. 1.4, Japan Aerospace Exploration Agency (JAXA)) discloses a technique that enable positioning even in an indoor environment where no positioning signal from GPS satellites can be received.

With such existing methods, however, a route inside a structure may not be displayed by using information indicating a floor of a structure on which a user is located or information indicating a floor of a building on which a destination is located.

There is a need for a technique for displaying a route to a destination by using information indicating a floor of a structure.

SUMMARY OF THE INVENTION

According to an aspect of the present invention, there is provided an information processing device configured to receive a positioning signal that is transmitted from a transmitting device. The information processing device includes an input reception unit configured to receive an input of a destination and configured to identify first location information including first floor number information, wherein the first floor number information indicates a floor number of the destination in a structure including the destination; a retrieval unit configured to retrieve second location information including second floor number information from the positioning signal, wherein the second floor number information indicates a floor number on which the transmitting device is provided in a structure in which the transmitting device is provided; and a calculation unit configured to calculate a route from a current location of the information processing device to the destination by using the first location information and the second location information.

According to another aspect of the present invention, there is provided an information processing method to be executed by an information processing device configured to receive a positioning signal that is transmitted from a transmitting device. The method includes an input receiving step of receiving an input of a destination and identifying first location information including first floor number information, wherein the first floor number information indicates a floor number of the destination in a structure including the destination; a retrieval step of retrieving second location information including second floor number information from the positioning signal, wherein the second floor number information indicates a floor number on which the transmitting device is provided in a structure in which the transmitting device is provided; and a calculation step of calculating a route from a current location of the information processing device to the destination by using the first location information and the second location information.

According to another aspect of the present invention, there is provided a non-transitory computer-readable medium storing a program for causing a computer that is configured to receive a positioning signal transmitted from a transmitting device to execute an input receiving step of receiving an input of a destination and identifying first location information including first floor number information, wherein the first floor number information indicates a floor number of the destination in a structure including the destination; a retrieval step of retrieving second location information including second floor number information from the positioning signal, wherein the second floor number information indicates a floor number on which the transmitting device is provided in a structure in which the transmitting device is provided; and a calculation step of calculating a route from a current location of the information processing device to the destination by using the first location information and the second location information.

According to an embodiment of the present invention, a route to a destination can be provided by using information indicating a floor number of structure.

Other objects, features and advantages of the present invention will become more apparent from the following detailed description when read in conjunction with the accompanying drawings.

BRIEF DESCRIPTION OF THE DRAWINGS

FIG. 10 is a diagram showing an example of a table that stores destination information;

FIG. 11 is a diagram showing an example of a table that stores location information;

FIG. 12 is a diagram showing an example of a table that stores device information;

FIG. 21 is a diagram showing an example of table that stores traveling cost information;

FIG. 22 is a diagram showing an example of information included in map information;

FIG. 23 is a diagram showing another example of the information included in the map information;

FIG. 26 is a diagram showing examples of identified routes;

FIG. 27 is a diagram showing examples of distances of the corresponding calculated routes; and FIG. 28 is a diagram showing examples of required time periods for the corresponding calculated routes.

DETAILED DESCRIPTION OF THE PREFERRED EMBODIMENTS

Figure 1:
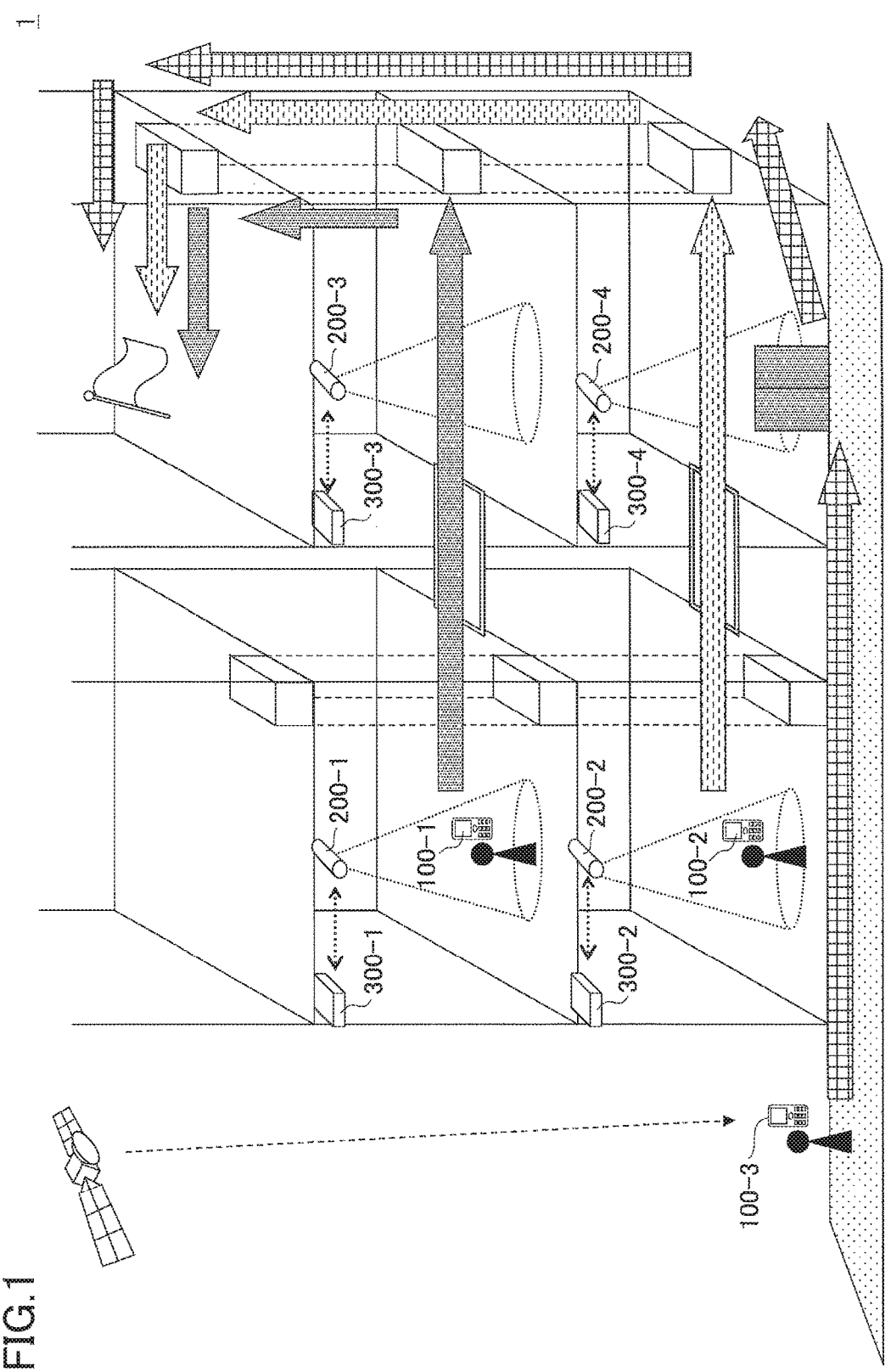
FIG. 1 is a schematic diagram showing an example of a system configuration according to an embodiment of the present invention.

Hereinafter, the embodiment of the present invention is explained by referring the accompanying drawings.

1. Out
2. Hardware configuration
2.1 Information processing device
2.2 Transmitting device
2.3 Management device
2.4 Location information management system (information delivery system)
3. Function
3.1 Route calculation function
3.2 Location information management function
4. Operation example
4.1 Route calculation processing
4.2 Location information retrieval processing
5. Application example (1. Outline)

Figure 2:
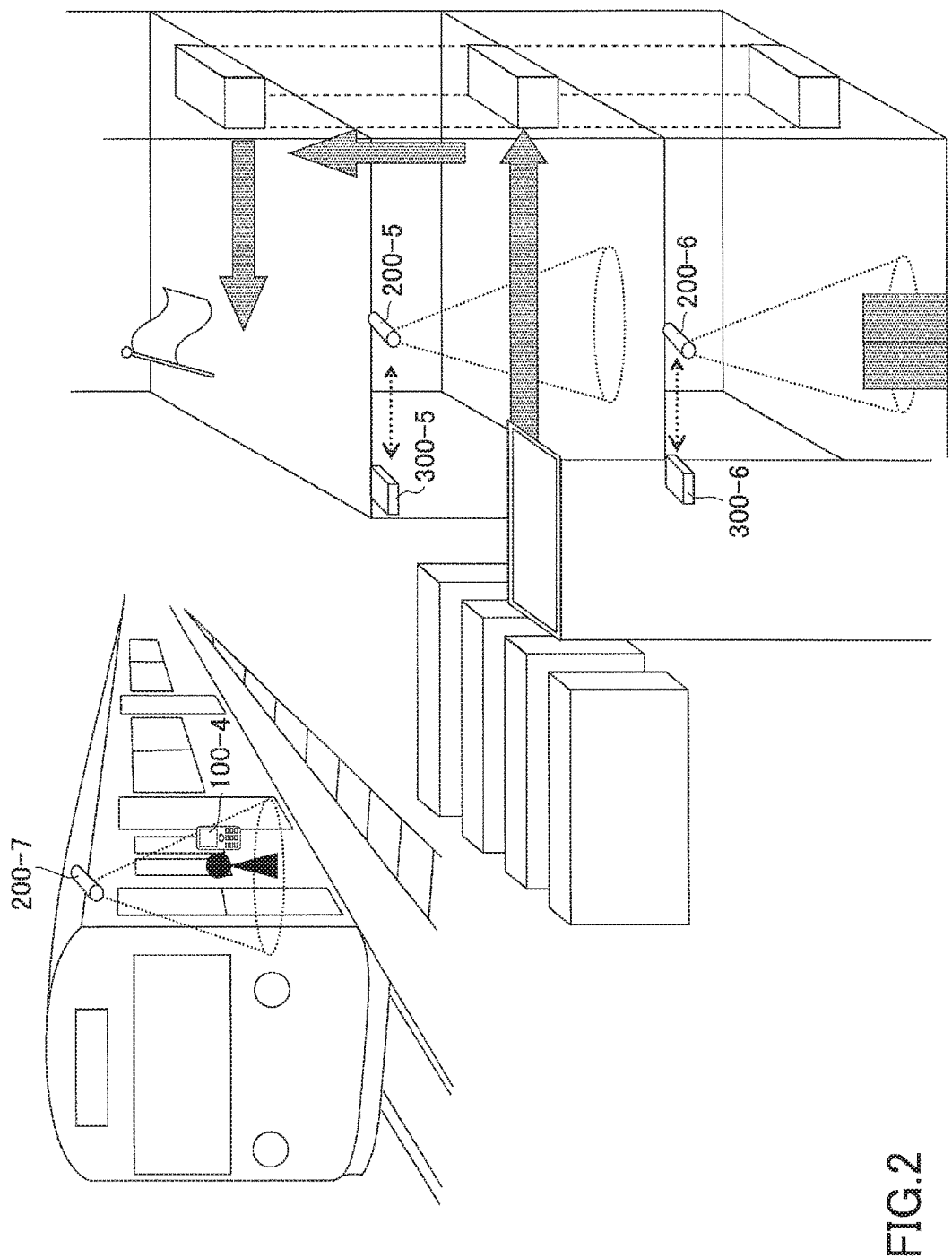
FIG. 2 is a schematic diagram showing another example of the system configuration according to an embodiment of the present invention.

FIGS. 1 and 2 are schematic diagrams of examples of an information processing system 1 according to the embodiment of the present invention. The information processing system 1 includes information processing devices 100-1 to 100-4 (which are collectively referred to as an "information processing device 100") that are carried by corresponding users; transmitting devices 200-1 to 200-7 (which are collectively referred to as a "transmitting device 200") that transmit positioning signals; and management devices 300-1 to 300-6 (which are collectively referred to as a "management device 300") that manage corresponding transmitting devices. The information processing device 100, the transmitting device 200, and the management device 300 form a radio network that conforms to a radio communications standard, such as ZigBee (registered trademark), Bluetooth (registered trademark), or WiFi (registered trademark). The management device 300 is also connected to an external network (e.g., the Internet, an intranet or the like), and the management device 300 mutually connects the radio network and the external network.

The information processing device 100 is an portable information processing terminal, such as a smartphone (a multi-function mobile phone), a tablet personal computer (PC), a mobile phone, or the like. The information processing device 100 may receive a positioning signal from a GPS satellite through a Global Positioning System (GPS) receiver, and thereby the information processing device 100 can retrieve location information of the information processing device 100 itself. Additionally, the information processing device 100 can receive a positioning signal according to the Indoor MEssaging System (IMES) that is transmitted from the transmitting device 200. In this manner, even under an environment where a positioning signal from a GPS satellite may not be received (e.g., an indoor environment or an underground environment), the information processing device 100 can retrieve the current position of the information processing device 100 itself through the transmitting device 200, and the information processing device 100 can calculate a route from the current position to a destination.

When the information processing device 100 calculates a route, the information processing device 100 can use building floor information included in a positioning signal that is configured, for example, according to the IMES standard.

The building floor information is information indicating a floor number of the structure. Accordingly, when the information processing device 100 calculates, for example, a route from a location inside of a building to a destination, the information processing device 100 can calculate a route from a floor (a floor number) on which the information processing device 100 is currently located to another floor where the destination is located.

Specifically, the information processing device 100 may calculate a route to a destination by using information indicating a floor number of the destination (first floor number information) and information indicating a floor (a floor number) of the structure where the transmitting device 200 is provided (second floor number information).

The first floor number information is retrieved from map information (which is described below), for example, when a destination is input to the information processing device 100. The second floor number information is retrieved from a positioning signal that is transmitted from the transmitting device 200 and received by the information processing device 100.

The transmitting device 200 is disposed inside a structure. Examples of the structure include an architectural product (a building structure having a roof and a pillar or a wall, such as a residence, an office, a factory, a warehouse, store, a hospital, an office building, etc.) and a means of transportation that is used in a transportation system (e.g., an electric train, a ship, an airplane, an automobile, etc.). Examples of the structure include those constructed with a plurality of materials, members and the like. The construction is such that weight is supported by a foundation or the like (e.g., a telephone pole, a road, an airport, a train station, a harbor facility, etc.).

For example, FIG. 1 shows an example of a route that is calculated for a case where the information processing devices 100-1 and 100-2 travel from corresponding different floors to the same destination. The information processing device 100 determines a current position in the building from information on latitude, longitude and a floor that is included in location information, and the information processing device 100 calculates a route to the destination by using map information (that is prepared in advance) of each of the floors in the building.

FIG. 1 also includes an example in which the information processing device 100-3 calculates a route from a location outside the building to the above-described destination. The information processing device 100 can calculate a route from the current location outside the building to an entrance of the building and a route from the entrance of the building to the destination. For calculation of the routes, it is assumed that both map information of the area outside the building (outdoor map information) and map information of the area inside the building (indoor map information) are available in advance. The outdoor map information includes information on a travelable road, a train station, a train line and the like. The indoor map information includes information on a connecting path between floors and information on a connecting path to the ground (a door). The connecting path between the floors is a connecting path that connects different floors in a structure. The door to the ground (the connecting path to the ground) is a connection path that connects the inside and outside of the structure. An entrance door of a store or the like that is provided on the same floor of a building is a connecting path that connects a plurality of areas provided in the same floor.

The information processing device 100 can also calculate a route from a place of arrival location on the path or a transit point at which the means of transportation is to arrive) to the destination inside the building by using the information on the means of transportation included in the positioning signal (e.g., a B train line of a railroad company A is being used or a D line of a bus company C is being used). FIG. 2 shows an example in which the information processing device 100-4 determines the station that is closest to the destination by using the information on the means of transportation (that is a railroad), and the information processing device 100-4 calculates a route from the building of the closet station to the destination. The information processing device 100 can calculate, by using map information of the building of the closest station that includes information on a connecting path between the station and the destination, a route from the current location of the information processing device 100 to the place of arrival of the means of transportation and a route from the place of arrival to the destination.

The information processing device 100 can retrieve the above-described map information from an external information delivery system (not shown in FIGS. 1 and 2) through a mobile communications network (e.g., a 3G network or a 4G network) or a wireless LAN, for example.

Figure 3:
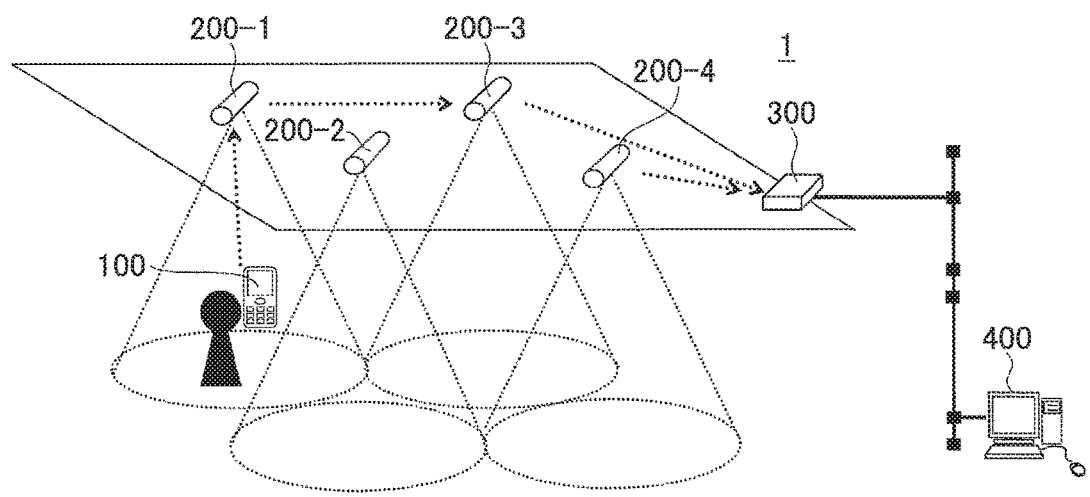
FIG. 3 is a diagram illustrating an example of a configuration of a radio network according to the embodiment of the present invention.
Figure 4:
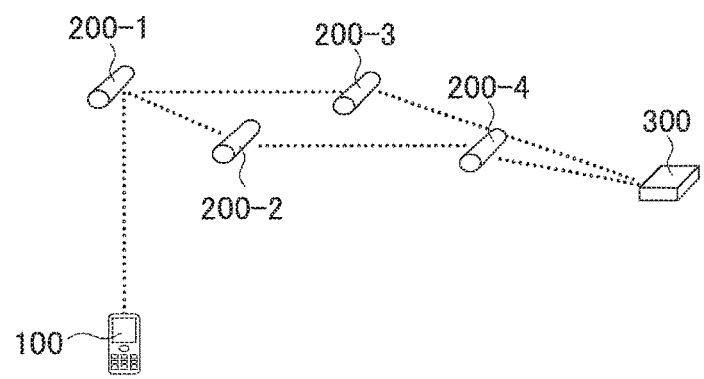
FIG. 4 is a diagram illustrating the example of the configuration of the radio network according to the embodiment of the present invention.

FIGS. 3 and 4 are diagrams for explaining the example of the radio network including the information processing device 100, the transmitting device 200, and the management device 300, which are described above. The positional arrangement of the devices shown in FIGS. 3 and 4 does not correspond to the positional arrangement of the devices shown in FIGS. 1 and 2. In FIG. 3, a location information management system 400 is shown. The location information management system 400 is connected to an external network. FIG. 4 is a diagram showing the information processing device 100, the transmitting device 200, and the management device 300 that are elements forming the radio network. Here, the information processing device 100, the transmitting device 200, and the management device 300 are extracted from FIG. 3 and shown in FIG. 4.

As shown in FIG. 3, each of the transmitting devices 200 transmits a positioning signal within a predetermined area. The positioning signal includes location information indicating a location where the transmitting device 200 itself is provided. When the information processing device 100 reaches the predetermined area, the information processing device 100 receives the positioning signal, and thereby the information processing device 100 can retrieve the above-described location information.

The information processing device 100 can transmit the location information that is obtained through the radio network to the transmitting device 200. In addition, the location information can be transmitted to the location information management system 400 through the management device 300. In this manner, the location information management system 400 can properly recognize the current location of the information processing device 100.

Hereinafter, there are explained details of the examples of the information processing device 100, the transmitting device 200, the management device 300, the location information management system 400, and the information delivery system in the embodiment of the present invention.

(2. Hardware Configuration)

Next, there are explained hardware configurations of the information processing device 100, the transmitting device 200, the management device 300, and the location information management system 400 (the information delivery system 500) according to the embodiment of the present invention by referring to FIGS. 5-8.

(2.1 Information Processing Device)

Figure 5:
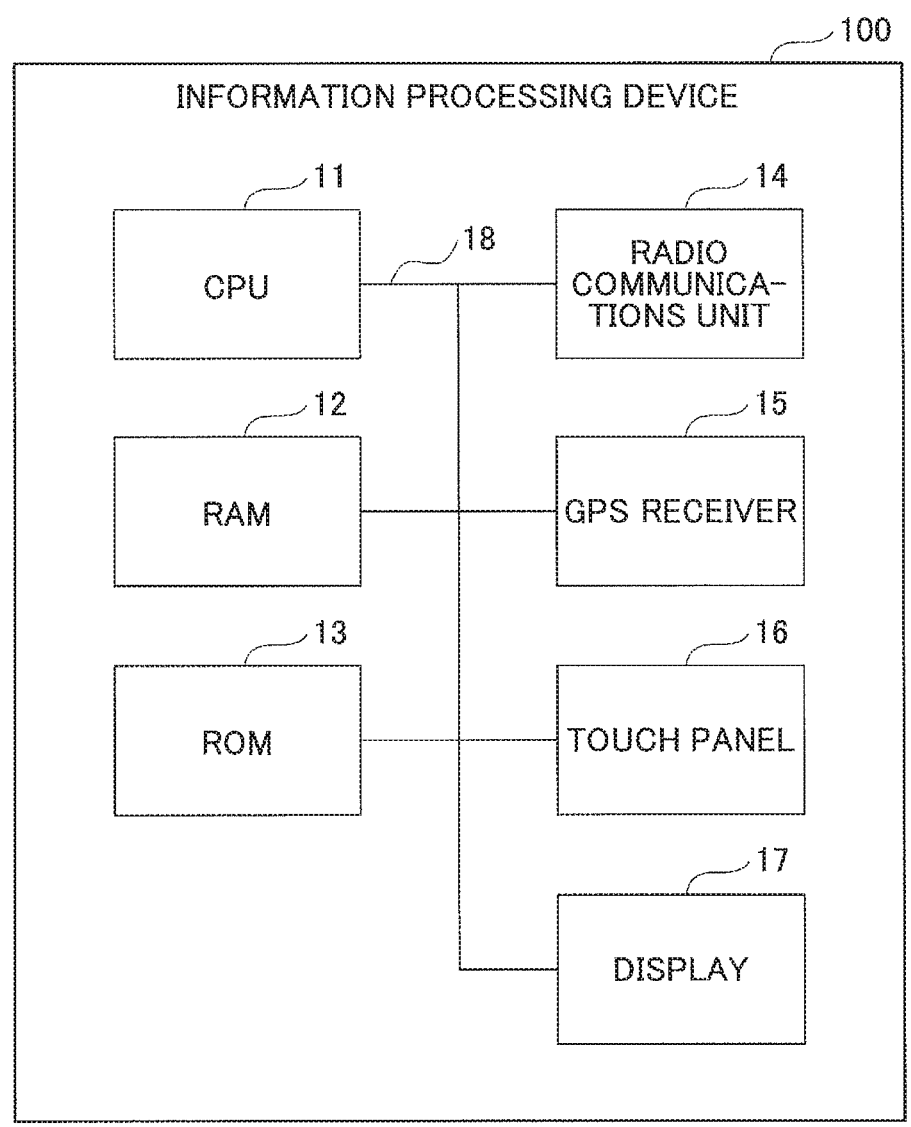
FIG. 5 is a hardware configuration diagram of an example of an information processing device according to the embodiment of the present invention.

FIG. 5 shows an example of the hardware configuration of the information processing device 100 according to the embodiment of the present invention. The information processing device 100 includes a CPU 11, a RAM 12, a ROM 13, a radio communications unit 14, a GPS receiver 15, a touch panel 16, and a display 17.

The CPU 11 is operable to execute a program for controlling operation of the information processing device 100. The RAM 12 may form a work area of the CPU 11. The ROM 13 may store a system program or the like of the information processing device 100. The radio communications unit 14 is a device for executing communications with an external device. The radio communications unit 14 may execute communications according to a communications standard, such as ZigBee (registered trademark), Bluetooth (registered trademark), 3G, 4G, WiFi (registered trademark), and so forth. The information processing device 100 may include a plurality of the radio communications devices 14. The GPS receiver 15 is a device for receiving a positioning signal that is transmitted from a GPS satellite or the transmitting device 200. The touch panel 16 is arranged in the information processing device 100 such that the touch panel 16 is superposed on the display 17. The touch panel 16 is a device for receiving an input by a user. The display 17 is a device for providing information to a user. A bus 18 is for electrically connecting the above-described device.

With the above-described configuration, the information processing device 100 according to the embodiment of the present invention can receive a positioning signal in an indoor environment or an outdoor environment, can calculate a route from the current location to the destination, and can display the route on the screen.

(2.2 Transmitting Device)

Figure 6:
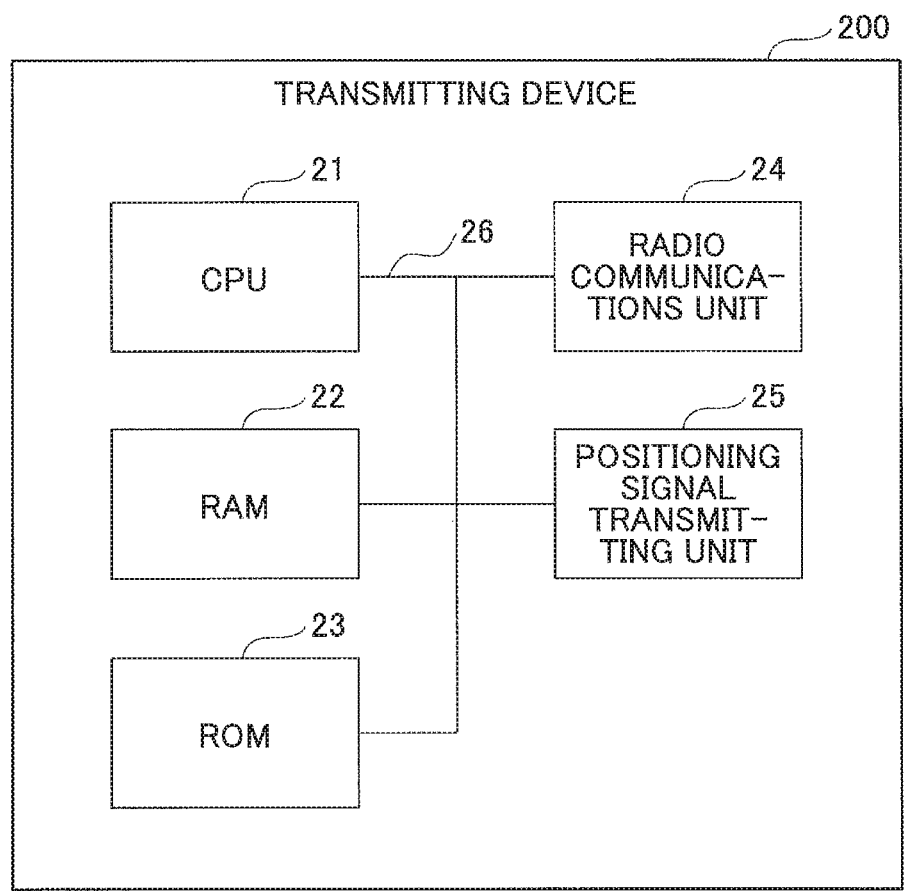
FIG. 6 is a hardware configuration diagram of an example of a transmitting device according to the embodiment of the present invention.

FIG. 6 shows an example of a hardware configuration of the transmitting device 200 according to the embodiment of the present invention. The transmitting device 200 includes a CPU 21, a RAM 22, a ROM 23, a radio communications device 24, and a positioning signal transmitting unit 25.

The CPU 21 is operable to execute a program for controlling operation of the transmitting device 200. The RAM 22 may form a work area and the like of the CPU 21. The ROM 23 may store a program that is executed by the CPU 21 and data required for executing a program. The radio communications unit 24 is a device for executing communications with devices, such as the information processing device 100 and the management device 300, through the radio network. The positioning signal transmitting unit 25 is a device for transmitting a positioning signal that is used by the information processing device 100 to retrieve the current location of the information processing device 100. The positioning signal transmitting unit 25 may transmit a positioning signal having a frame format that is defined by the IMES standard, for example. Specifically, the positioning signal transmitting unit 25 may generate a signal by modulating a carrier wave of 1.5 GHz using data having the frame format that is defined by the IMES standard. The positioning signal transmitting unit 25 may transmit the thus generated signal through an antenna. The bus 26 is for electrically connecting the above-described devices.

With the above-described configuration, the transmitting device 200 according to the embodiment of the present invention can transmit a positioning signal to the information processing device 100. Additionally, the transmitting device 200 can form the radio network with the information processing device 100 and the management device 300.

(2.3 Management Device)

Figure 7:
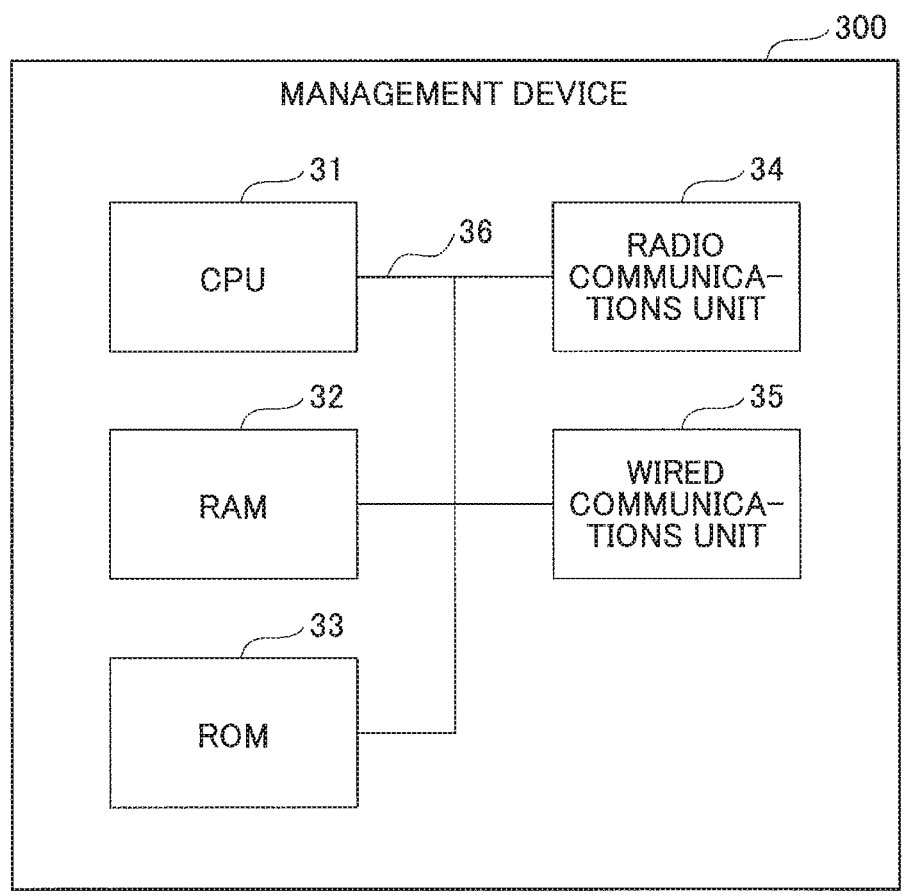
FIG. 7 is a hardware configuration diagram of an example of a management device according to the embodiment of the present invention.

FIG. 7 shows an example of a hardware configuration diagram of the management device 300 according to the embodiment of the present invention. The management device 300 includes a CPU 31, a RAM 32, a ROM 33, a radio communications unit 34, and a wired communications unit 35.

The CPU 31 is operable to execute a program for controlling operation of the management device 300. The RAM 32 may form a work area and the like of the CPU 31. The ROM 33 may store a program that is executed by the CPU 31 and data required for executing a program. The radio communications unit 34 is a device for executing communications with devices, such as the information processing device 100, the transmitting device 200 and the like, through the radio network. The wired communications unit 35 is a device for executing communications with an external network through a network, such as the Internet or an intranet. The bus 36 is for electrically connecting the above-described devices.

With the above-described configuration, the management device 300 according to the embodiment of the present invention can mutually connect the radio network (that is formed of the information processing device 100, the transmitting device 200, and the management device 300) and the external network.

(2.4 Location Information Management System (Information Delivery System))

Figure 8:
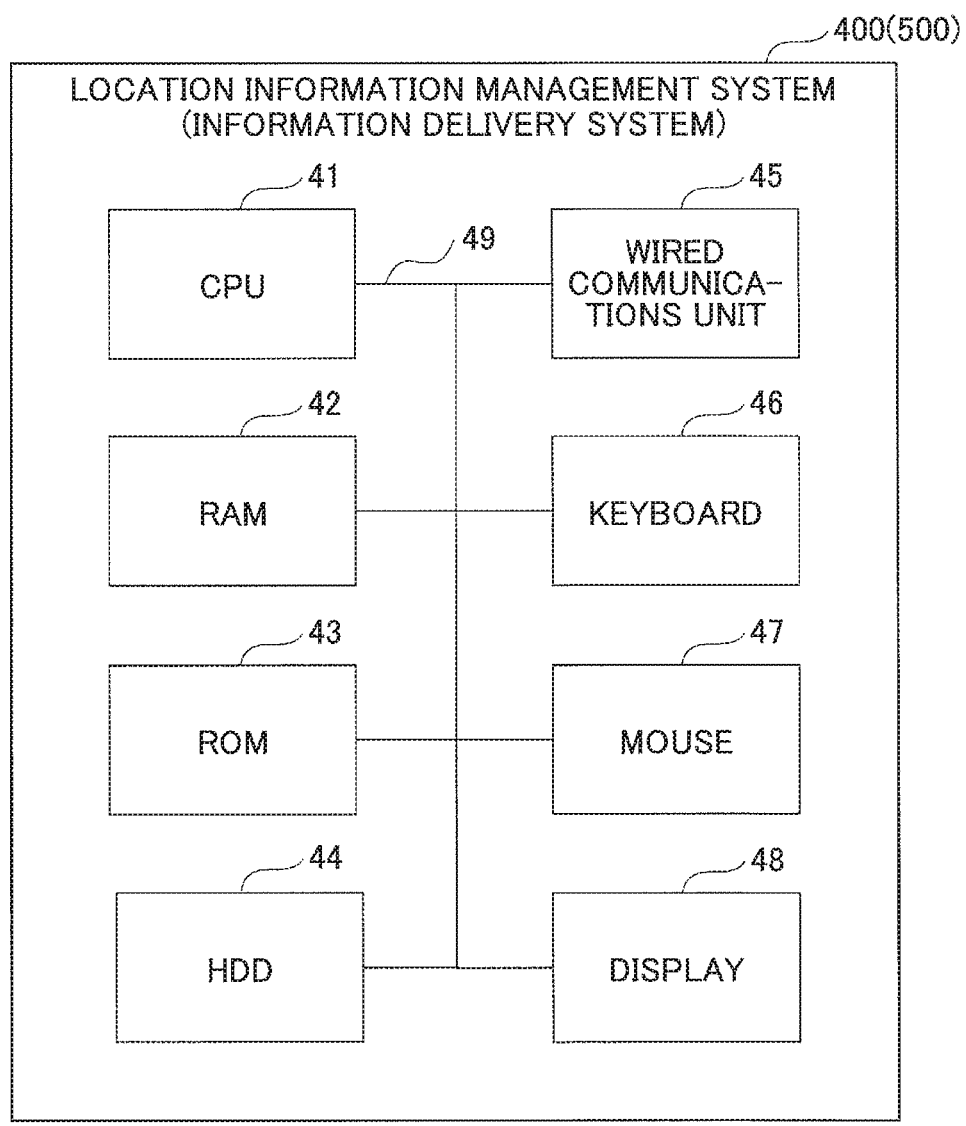
FIG. 8 is a hardware configuration diagram of an example of a location information management system or an information delivery system according to the embodiment of the present invention.

FIG. 8 shows an example of the hardware configuration of the location information management system 400 or an information delivery system 500 according to the embodiment of the present invention. The location information management system 400 includes a CPU 41, a RAM 42, a ROM 43, a HDD 44, a wired communications unit 45, a keyboard 46, a mouse 47, and a display 48.

The CPU 41 is operable to execute a program for controlling operation of the location information management system 400. The RAM 42 may form a work area of the CPU 41. The ROM 43 may store a system program or the like of the location information management system 400. The HDD 44 may store location information and device information of the information processing device 100, in addition to an application, user data and the like of the location information management system 400. The HDD 44 of the information delivery system 500 may store map information, route information and the like that may be required for the information processing device 100 to calculate a route. The wired communications unit 45 is a device for executing communications with a device, such as the management device 300, through the Internet or an intranet. The keyboard 46 and the mouse 47 are devices for receiving an input by a user. The display 48 is a device for presenting information to a user. The bus 49 is for electrically connecting the above-described devices.

With the above-described configuration, the location information management system 400 according to the embodiment of the invention can retrieve location information of the information processing device 100 through the radio network. Additionally, the information delivery system 500 may deliver map information and the like to the information processing device 100 through the 3G network, the 4G network, a wireless LAN, or the like.

(3. Function)

Figure 9:
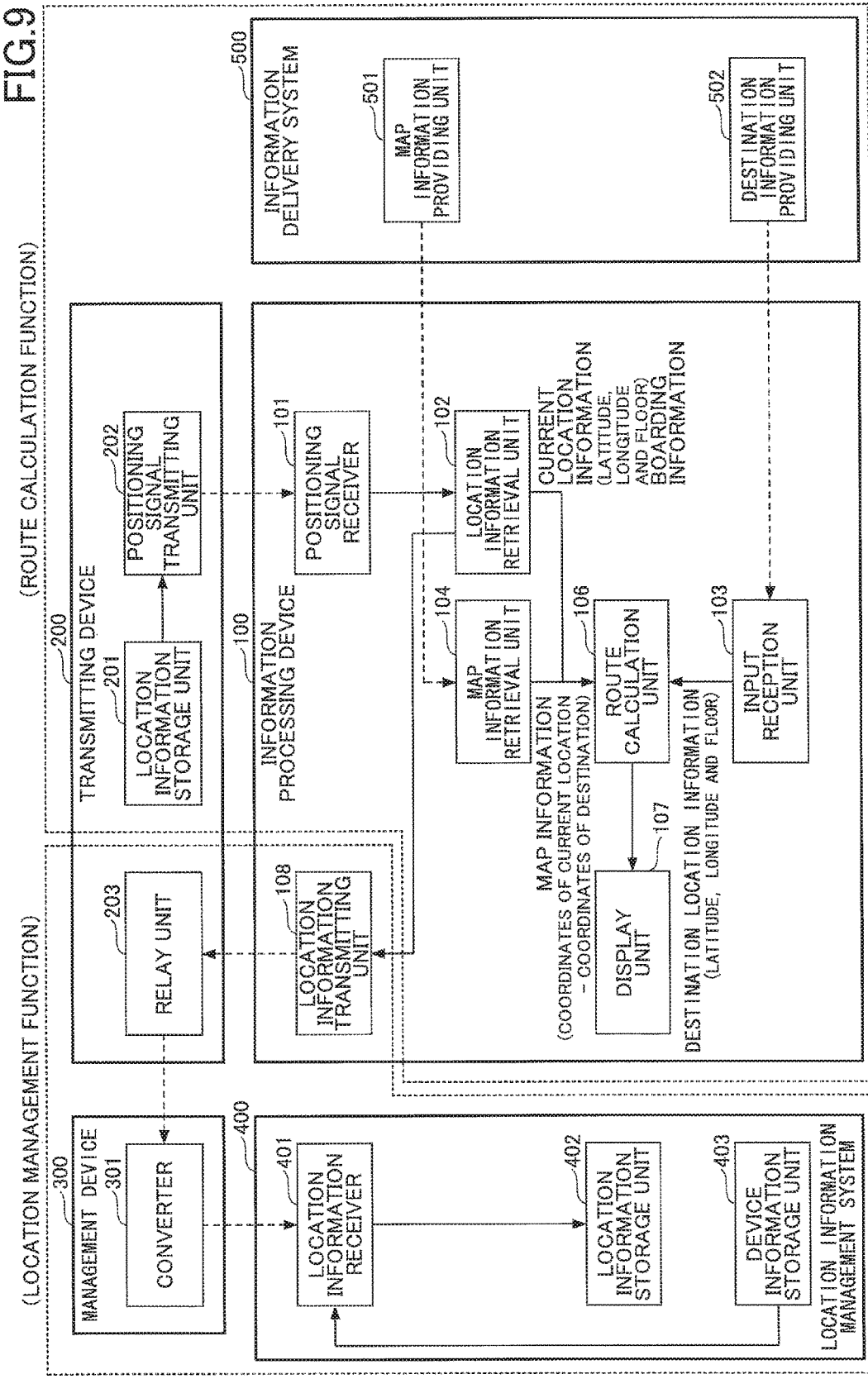
FIG. 9 is a functional block diagram of an example of the information processing device or the like according to the embodiment of the present invention.

Next, there are explained functional blocks of the information processing device 100, the transmitting device 200, the management device 300, the location information management system 400, and the information delivery system 500 according to the embodiment of the present invention by referring to FIG. 9. FIG. 9 shows elements that are particularly related to the explanation of the embodiment, among various elements included in these devices. In FIG. 9, each of the arrows connecting the corresponding elements shows an information flow between the corresponding elements. Especially, the arrows indicated by the dotted lines show information flows between different devices. In the following description, the functions provided by the above-described configuration are explained by dividing the functions into a "route calculation function" and a "location information management function." In FIG. 9, the two functional blocks mainly related to the route calculation function and the location information management function, respectively, are surrounded by corresponding dotted lines.

(3.1 Route Calculation Function)

First, the route calculation function is explained that is for calculating a route from the current location of the information processing device 100 to a user's desired destination.

The transmitting device 200 according to the embodiment of the present invention includes a location information storage unit 201 and a positioning signal transmitting unit 202. Other functional blocks are described below.

The location information storage unit 201 may be implemented by the ROM 23 shown in FIG. 6. The location information storage unit 201 may store location information indicating a location where the transmitting device 200 is provided. The location information of the transmitting device 200 installed in an indoor environment includes information on latitude, longitude and a floor, for example. Namely, the information on the floor that is included in the location information indicating the location where the transmitting device 200 is installed is second floor number information indicating a floor number of the building where the transmitting device 200 is installed. When the transmitting device 200 is installed inside a means of transportation such as a train, a shuttle bus, or a ship, the location information of the transmitting device 200 may further include information on the means of transportation, such as information on a train line of the train. The details of the information on the means of transportation are described below. For example, the information on the means of transportation may indicate use of a certain line of a certain railroad company. The information on the means of transportation may be used for determining whether a route for a means of transportation is to be calculated or a route for walking is to be calculated.

Figure 13:
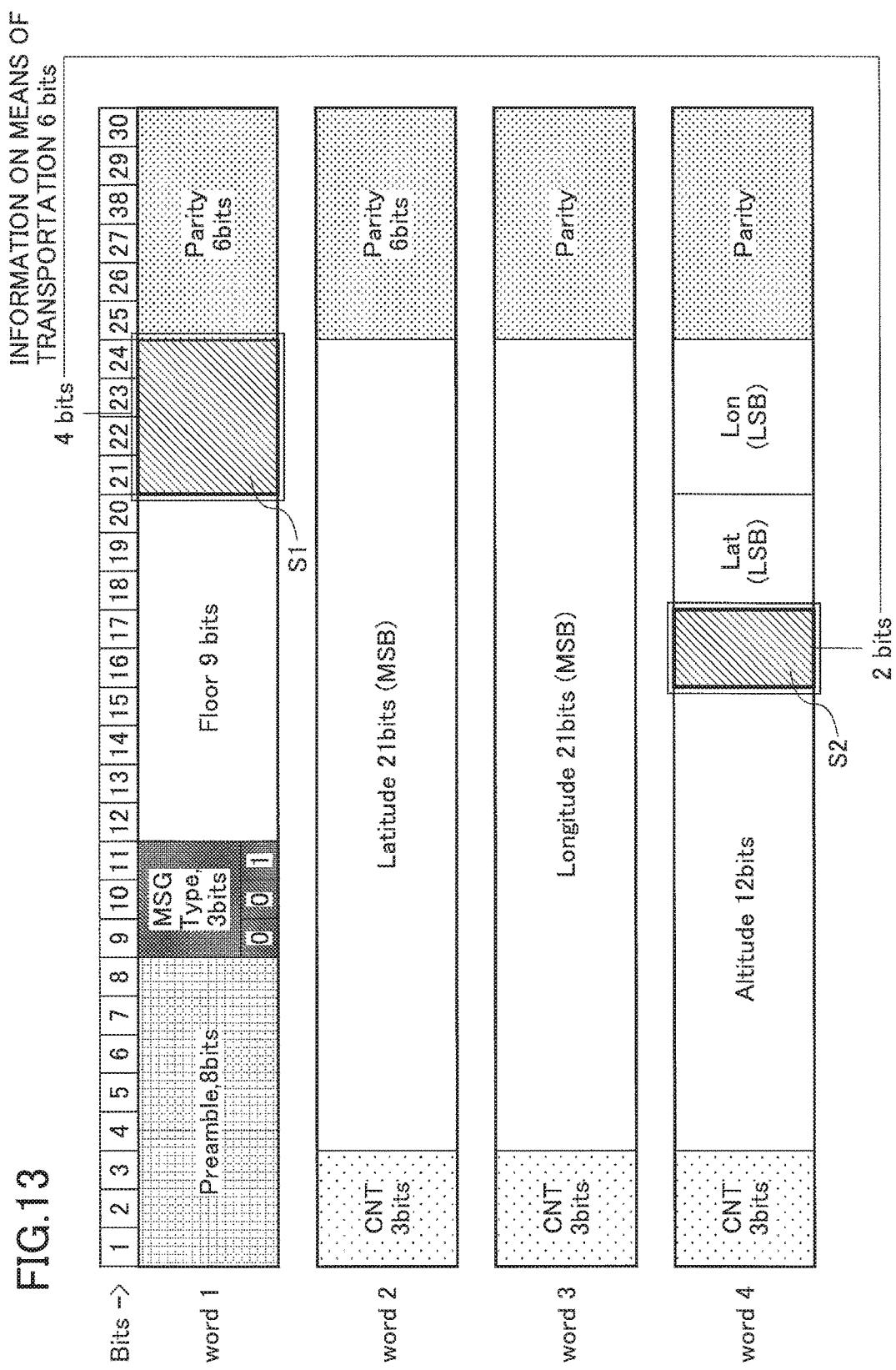
FIG. 13 is a diagram showing an example of a frame format of a positioning signal.

The positioning signal transmitting unit 202 may be implemented by the positioning signal transmitting unit 25. The positioning signal transmitting unit 202 may generate a positioning signal including the location information stored in the location information storage unit 201, and the positioning signal transmitting unit 202 may transmit the thus generated positioning signal within a predetermined area. The predetermined area may be determined by a transmission output of a radio wave transmitted from the positioning signal transmitting unit 25. As shown in FIG. 13, the positioning signal may have a frame structure that is defined by the IMES standard, for example. FIG. 13 shows an exam of the frame structure such that the "message type ID" is "001," among frame structures defined by the IMES standard. The above-described floor information may be stored in the field of "Floor" as data having a length of nine bits. The information on the means of transportation may be stored in the fields indicated in FIG. 13 by S1 and S2, respectively, as data having a total length of nine bits, for example. When data "101010" is stored as the information on the means of transportation, for example, the data may indicate that "a B train line of a railroad company A" is being used. When data "000000" is stored as the information on the means of transportation, the data may indicate that no means of transportation is used (i.e., moving on foot). The information on the means of transportation may be represented by data having any bit length. For example, in addition to the fields indicated by S1 and S2, the field of "Altitude" may be utilized to indicate the information on the means of transportation. In this case, the information on the means of transportation may be stored as data having a total length of eighteen bits.

The information on the means of transportation itself may identify a line of the means of transportation (e.g., a train line). Alternatively, a combination of the information on the means of transportation, latitude and longitude may identify the line of the means of transportation. For example, when the information on the means of transportation is represented by data having a length of eighteen bits, each one of 2 to the eighteenth bit patterns may correspond to one of a plurality of lines of the means of transportation. Alternatively, the information on the means of transportation may simply be two bit information indicating whether the means of transportation is being used or not. In this case, one of the plurality of lines may be identified by latitude and longitude.

Additionally, a frame structure may be used such that the "message type ID" defined by the IMES standard is "3" or "4," though such a frame structure is not shown. In this case, floor information may be stored by using "Short ID" of twelve bits or "Medium ID" of thirty three bits.

The information delivery system 500 according to the embodiment of the present invention includes a map information providing unit 501 and a destination information providing unit 502. The information delivery system 500 may deliver map information in response to a request from the information processing device 100.

The map information providing unit 501 may be implemented by processing of the CPU 41 and the wired communications unit 45 that are shown in FIG. 8. The map information providing unit 501 may provide map information in response to a request from the information processing device 100. The map information may be delivered by using any existing map format.

The destination information providing unit 502 may be implemented by processing of the CPU 41 and the wired communications unit 45. The destination information providing unit 502 may provide destination information in response to a request from the information processing device 100. The destination information may include, for example, information on a name of the destination, latitude, longitude, and a floor, that is exemplified in FIG. 10. Namely, the floor information included in the destination information is first floor number information indicating a floor number of the destination in the structure. The destination information may be used for identifying the location information of the destination, when a user of the information processing device 100 designates the destination by using the name of the destination.

The information processing device 100 according to the embodiment of the present invention includes a positioning signal receiver 101, location information retrieval unit 102, an input reception unit 103, a map information retrieval unit 104, a route calculation unit 106, and a display unit 107. Other functional blocks are described below.

The positioning signal receiver 101 may be implemented by processing of the GPS receiver 15 shown in FIG. 5. The positioning signal receiver 101 may receive a positioning signal transmitted from the positioning signal transmitting unit 202 of the transmitting device 200. The positioning signal receiver 101 may also receive a positioning signal transmitted from a GPS satellite.

The location information retrieval unit 102 may be implemented by processing of the CPU 11 and the GPS receiver 15 shown in FIG. 5. The location information retrieval unit 102 may retrieve location information from a positioning signal transmitted from the transmitting device 200. As described above, the location information may include information on latitude, longitude, a floor and a means of transportation. The location information retrieval unit 102 may also retrieve location information from a positioning signal that is transmitted from a GPS satellite. However, the location information included in the positioning signal from the GPS satellite may not include information on a floor and a means of transportation. The location information retrieval unit 102 may send the retrieved information to the route calculation unit 106, which is described below.

The input reception unit 103 may be implemented by processing of the touch panel 16 shown in FIG. 5. The input reception unit 103 may receive an input of a name of a destination by a user. The input reception unit 103 may send location information representing the location of the destination to the route calculation unit 106, which is described below. The location information of the destination may be identified by the input reception unit 103 by using the destination information (FIG. 10) that is retrieved from the destination information providing unit 502 of the information delivery system 500.

After a route is calculated, the input reception unit 103 may receive an operation input for manually changing the route or fine adjustment of the route.

The map information retrieval unit 104 may be implemented by processing of the CPU 11 and the radio communications unit 14 shown in FIG. 5. The map information retrieval unit 104 may retrieve map information from the map information providing unit 501 of the information delivery system 500, in response to an instruction from the route calculation unit 106.

The route calculation unit 106 may be implemented by processing of the CPU 11 shown in FIG. 5. The route calculation unit 106 may calculate a route from a location indicated by the location information that is received from the location information retrieval unit 102 to a destination that is received from the input reception unit 103. The route calculation unit 106 may calculate a route to a destination by using a known route search algorithm, such as Dijkstra's algorithm or A* search algorithm. The route calculation unit 106 may calculate a route by causing the map information retrieval unit 104 to properly retrieve map information (which includes names and locations of roads, pathways, buildings or stores, lines of means of transportation, stations and so forth) within a certain area that includes the current location of the information processing device 100 and a destination.

The route calculation unit 106 may calculate, for example, a route within a building by using the floor information that is included in the location information retrieved from the positioning signal from the transmitting device 200 and the floor information that is included in the location information indicating the location of the destination.

Figure 14:
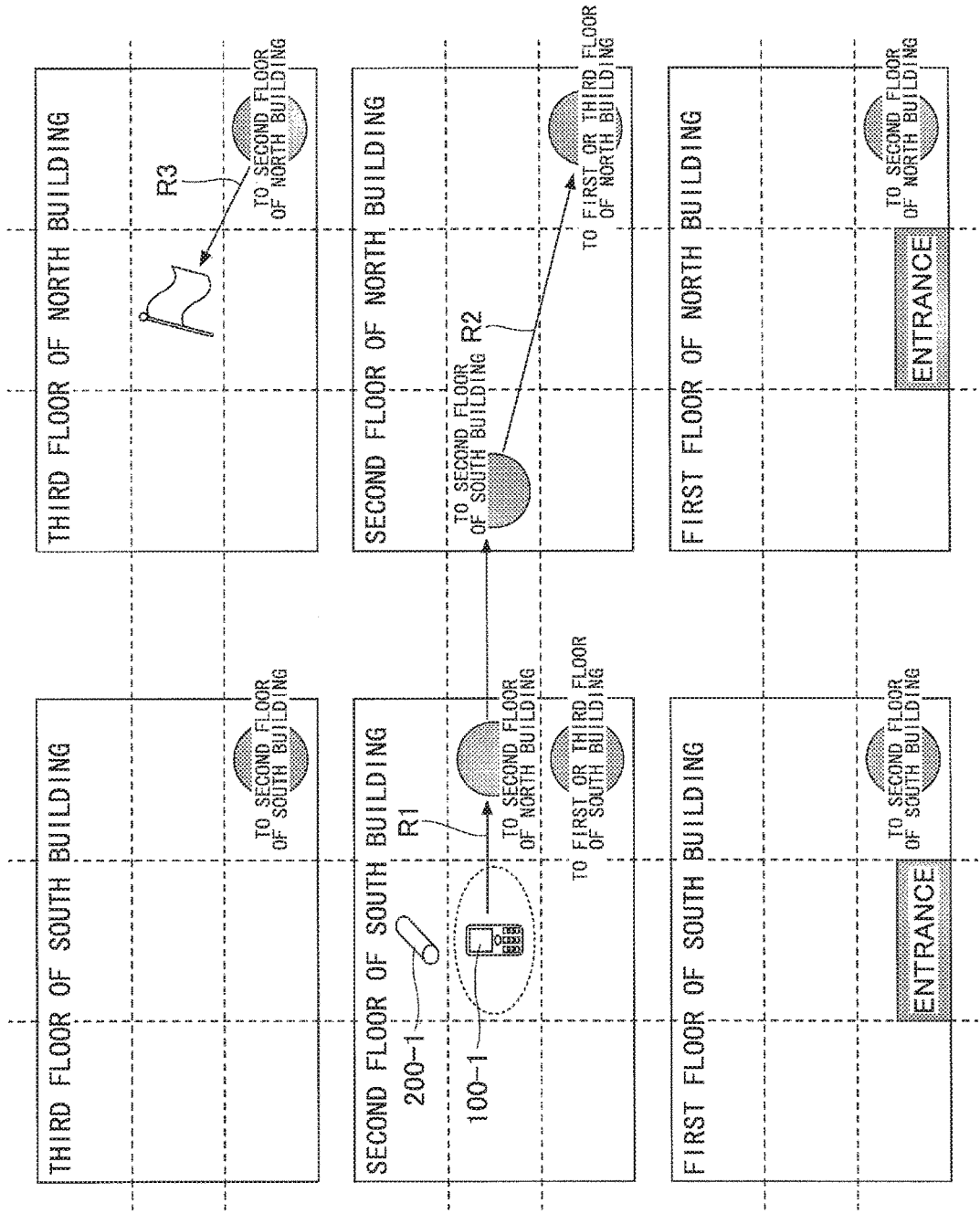
FIG. 14 is a diagram showing an example of a method of calculating a route.

FIG. 14 shows an example of a method of calculating a route by using floor information. FIG. 14 shows floor maps of two buildings that are a "north building" and a "south building". Each of the north building and the south building has three floors. In each of the north building and the south building, the floors are connected by an elevator. A user can travel back and forth among the floors. Additionally, the second floors of the north building and the south buildings are connected by a skybridge. Since the map information of each floor includes information representing connection routes to corresponding other floors, the route calculation unit 106 can calculate a route to the destination inside the building by using this information.

In the example of FIG. 14, the information processing device 100-1 receives a positioning signal transmitted by the transmitting device 200-1, and the information processing device 100-1 recognizes that the current location is the central area of the second floor of the south building. Additionally, it is assumed that the information processing device 100-1 receives an input, by a user, indicating that a destination is Shop A in the north building (the central area on the third floor of the north building). At this time, the route calculation unit 106 calculates, for example, a route from the current location to the destination in accordance with the following procedure.

(1) The route calculation unit 106 retrieves map information of all the floors of the building (the south building) corresponding to the current location and map information of all the floors of the building (the north building) where the destination is located through the map information retrieval unit 104. The route calculation unit 106 also retrieves map information of an area on the ground in the vicinity of the current location and the destination.

(2) The route calculation unit 106 determines whether there exists a connection path from the current floor (the second floor of the south building) to the north building where the destination is located. Here, there exists a connection path to the north building on the second floor. Thus, the route calculation unit 106 calculates the shortest route R1 from the current location to the connection path to the north building.

(3) The route calculation unit 106 calculates the shortest route from the connection path (to the south building) on the second floor of the north building to the destination. In the example of FIG. 14, the destination is located on a floor other then the second floor of the north building. Thus, the route calculation unit 106 calculates the shortest route R2 from the connection path (to the south building) to a connection path to the floor other than the second floor of the north building.

(4) The route calculation unit 106 calculates the shortest route R3 (on the third floor of the north building where the destination is located) from the connection path (to the floor other than the second floor of the north building) to the destination.

Here, when no connection path to the north building exists on the same floor at the above-described step of (2), the route calculation unit 106 may search for a floor on which a connection path to the north building exists, and the route calculation unit 106 may calculate the shortest route to that floor. The post processing is the same as that of the above-described steps of (3) and (4). When no connection path to the north building exists in the south building, the route calculation unit 106 may calculate the shortest route to an entrance of the south building on the ground floor (the first floor), then the route calculation unit 106 may calculate the shortest route from the entrance of the south building to an entrance of the north building on the ground floor (the first floor). Subsequently, similar to the above-described step of (3), the route calculation unit 106 may calculate the shortest route from the entrance of the north building to the floor where the destination is located. The above described search method is for exemplifying purpose only. The route calculation unit 106 may search for a route from the current location to the destination by using any known search algorithm.

Figure 15:
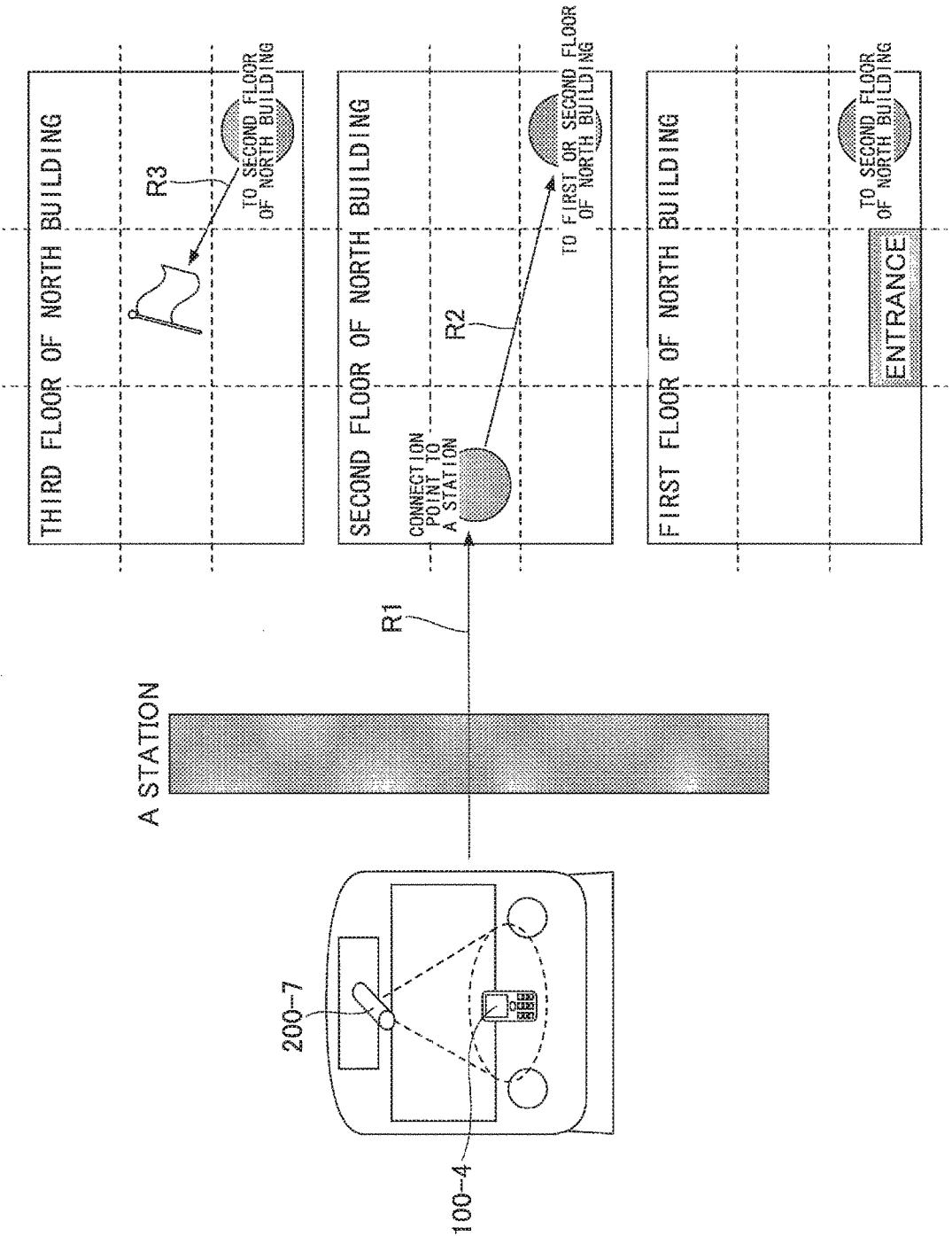
FIG. 15 is a diagram showing another example of the method of calculating a route.

FIG. 15 shows an example of calculating a route for a case in which information on the means of transportation included in the location information of the transmitting device 200 is utilized. The three floors shown in FIG. 15 are the same as those of the north building of FIG. 14. Here, the map information of the second floor shown in FIG. 15 includes information on a connection path to an A station, instead of the connection path to the south building.

In the example of FIG. 15, the information processing device 100-4 receives a positioning signal that is transmitted by the transmitting device 200-7, and the information processing device 100-4 recognizes that the information processing device 100-4 is being moved by utilizing a B train line of a railroad company A. Additionally, it is assumed that the information processing device 100-4 receives an input, by a user, indicating that a destination is Shop A in the north building (the central area on the third floor of the north building). At this time, the route calculation unit 106 calculates, for example, a route from the current location to the destination in accordance with the following procedure.

(1) The route calculation unit 106 retrieves map information of a neighboring area between the current location (on the ground) and the north building that is the destination and map information of all the floors within the destination building (the north building) through the map information retrieval unit 104.

(2) The route calculation unit 106 determines the closest station (which is referred to as an "A station") to the north building, and the route calculation unit 106 calculates the shortest route from the current position that is located on the B train line of the railroad company A to the A station (which may be determined by the shortest transfer route or the like).

(3) The route calculation unit 106 retrieves map information of all the floors of the building of the A station, which is the closest station to the north building, through the map information retrieval unit 104. Here, the building of the closest station to the north building is the north building itself. Thus, the map information of the building of the closest station is already retrieved.

(4) The route calculation unit 106 calculates the shortest route from a connection path (to the A station) of the map information of the building of the A station to the destination. The post processing is the same as that of the example that is explained by referring to FIG. 14.

The above-described search method is for exemplifying purpose only. The route calculation unit 106 may search for, by using any known search algorithm, a route from the current location on the train line of the railroad company to the station or the like and a walking route from the station or the like to the destination after getting off at the station or the like.

The display unit 107 may be implemented by processing of the display 17 shown in FIG. 5. The display unit 107 may display a route calculated by the route calculation unit 106 on the display 17. The display 107 may display a route in any form. For example, as shown in FIGS. 1 and 2, the display unit 107 may display the map of the building and the route from a point of view such that the building can be overlooked from the sky. Alternatively, as shown in FIGS. 14 and 15, the route may be displayed on planar maps.

With the above-described functions, the information processing device 100 according to the embodiment of the present invention can effectively provide a route to a destination inside a building by using floor information. Especially, when the information processing device 100 is located on an upper floor, the information processing device 100 can provide a route to an adjacent destination building through a skybridge or the like. In this manner, when a user attempts to reach an adjacent destination building, the user may avoid an awkward situation such that the user is required to go outside the building once.

Additionally, when the information processing device 100 according to the embodiment of the present invention is being moved by using a means of transportation, such as a train, the information processing device 100 can calculate a route to a destination building by using floor information of the building of the destination station. In this manner, when the destination building is located at a railroad station, the shortest route from a drop-off floor of the railroad station to a floor where the destination is located can be provided.

(3.2 Location Information Management Function)

Next, a location information management function is explained. The location information management function may retrieve and manage location information of the information processing device 100. The location information of the information processing device 100 is transmitted to the location information management system 400 through the radio network.

The information processing device 100 according to the embodiment of the present invention further includes a location information transmitting unit 108.

The location information transmitting unit 108 may be implemented by processing of the CPU 11 and the radio communications unit 14. The location information transmitting unit 108 may transmit location information that is retrieved by the location information retrieval unit 102 and identifying information (e.g., a MAC address) that is assigned to the information processing device 100 to the transmitting device 200 through the radio network. After that, the location information and the identifying information may be relayed by the management device 300, and the location information and the identifying information are transmitted to the location information management system 400. The location information and the identifying information may be transmitted at any timing.

The transmitting device 200 according to the embodiment of the present invention further includes a relay unit 203.

The relay unit 203 may be implemented by processing of the CPU 11 and the radio communications unit 14 shown in FIG. 5. The relay unit 203 may relay location information and identifying information transmitted from the information processing device 100. The relayed location and identifying information may be transmitted to the next node (another transmitting device 200 or the management device 300) based on routing information stored in the transmitting device 200. After that, the location information and the identifying information may reach the management device 300, and subsequently the location information and the identifying information may be transmitted to the location information management system 400. When the radio network conforms to the ZigBee (registered trademark) standard, the relay unit 203 may provide a function of a ZigBee router (a device having a function of relaying data from a ZigBee end point or another ZigBee router).

The management device 300 according to the embodiment of the present invention includes a converter 301. The management device 300 may manage the radio network that is formed of the information processing device 100 and the transmitting device 200. When the radio network conforms to the ZigBee (registered trademark) standard, the management device 200 may provide functions as a ZigBee coordinator.

The converter 301 may be implemented by processing of the CPU 31 and the radio communications unit 34. The converter 301 may convert data that is received from the transmitting device 200 through the radio network into data having a format that conforms to an external network (e.g., the Internet or an intranet) that is connected to the location information management system 400. Then, the converter 301 may transmit the data to the location information management system 400.

The location information management system 400 according to the embodiment of the present invention includes a location information receiver 401, a location information storage unit 402, and a device information storage unit 403.

The location information receiver 401 may be implemented by processing of the CPU 41 and the wired communications unit 45 shown in FIG. 8. The location information receiver 401 may receive identifying information and location information transmitted from the information processing device 100 through the transmitting device 200 and the management device 300. Then, the location information receiver 401 may receive the identifying information and the location information in the location information storage unit 402.

The location information storage unit 402 may be implemented by the HDD 44 shown in FIG. 8. The location information storage unit 402 may define correspondence among the identifying information of the information processing device 100, the location information of the information processing device 100 and reception date and time of the identifying information and the location information. The location information storage unit 402 may store the identifying information, the location information, and the reception date and time for which the correspondence is defined. FIG. 11 shows an example of a table for storing these types of information. Here, a plurality of tables can be prepared. The number of the tables may correspond to the number of the information processing devices 100 for each of which location information is to be obtained.

The device information storage unit 403 may be implemented by the HDD 44 shown in FIG. 8. The device information storage unit 403 may define correspondence among identifying information, a device name, and an owner's name of the information processing device 100. The device information storage unit 403 may store the identifying information, the device name, and the owner's name for which the correspondence is defined. FIG. 12 shows an example of a table for storing these types of information. The table may be used for identifying information on a device name and an owner's name from identifying information of the information processing device 100.

With the above-described functions, location information of the information processing device 100 can be managed in the location information management system 400.

The functions of the location information management system 400 and the functions of the information delivery system 500 may be integrated into a single computer. Alternatively, the functions of the location information management system 400 and the functions of the information delivery system 500 may be distributed over one or more computers that are connected on a network.

(4. Operation Example)

Figure 16:
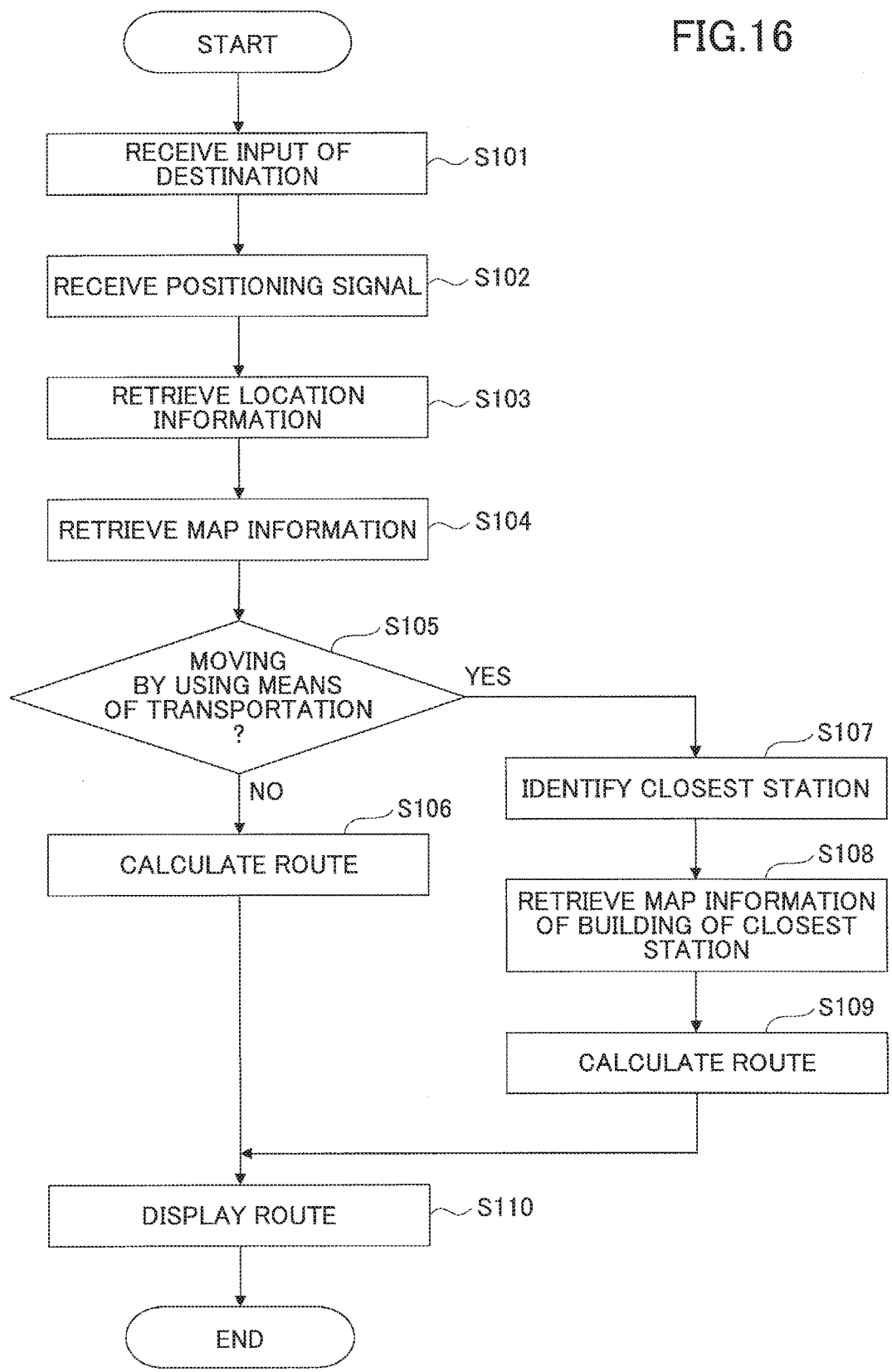
FIG. 16 is a flowchart showing an example of a processing flow of the information processing device according to the embodiment of the present invention.
Figure 17:
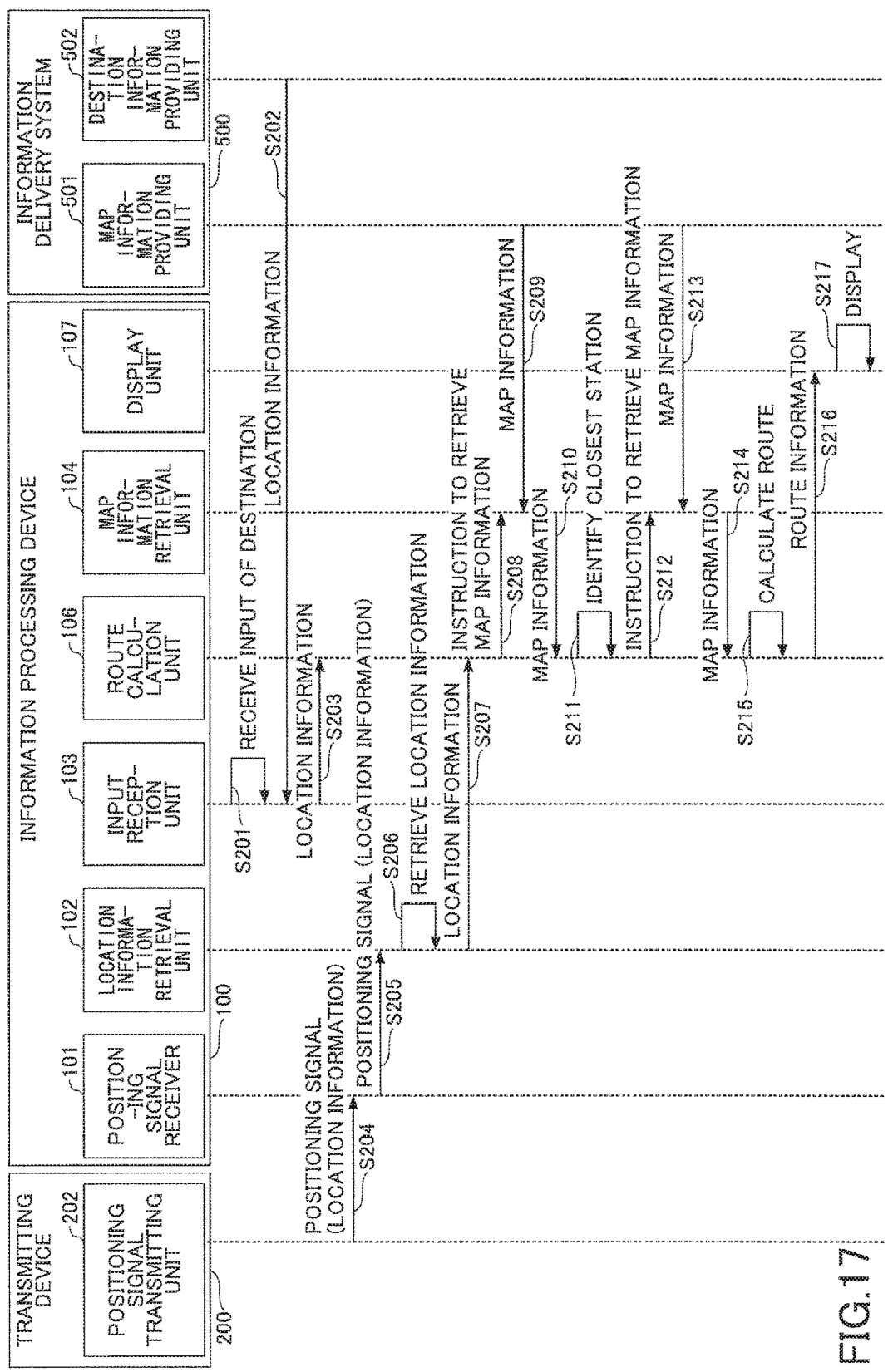
FIG. 17 is a sequence diagram showing an operation example of the information processing device or the like according to the embodiment of the present invention.
Figure 18:
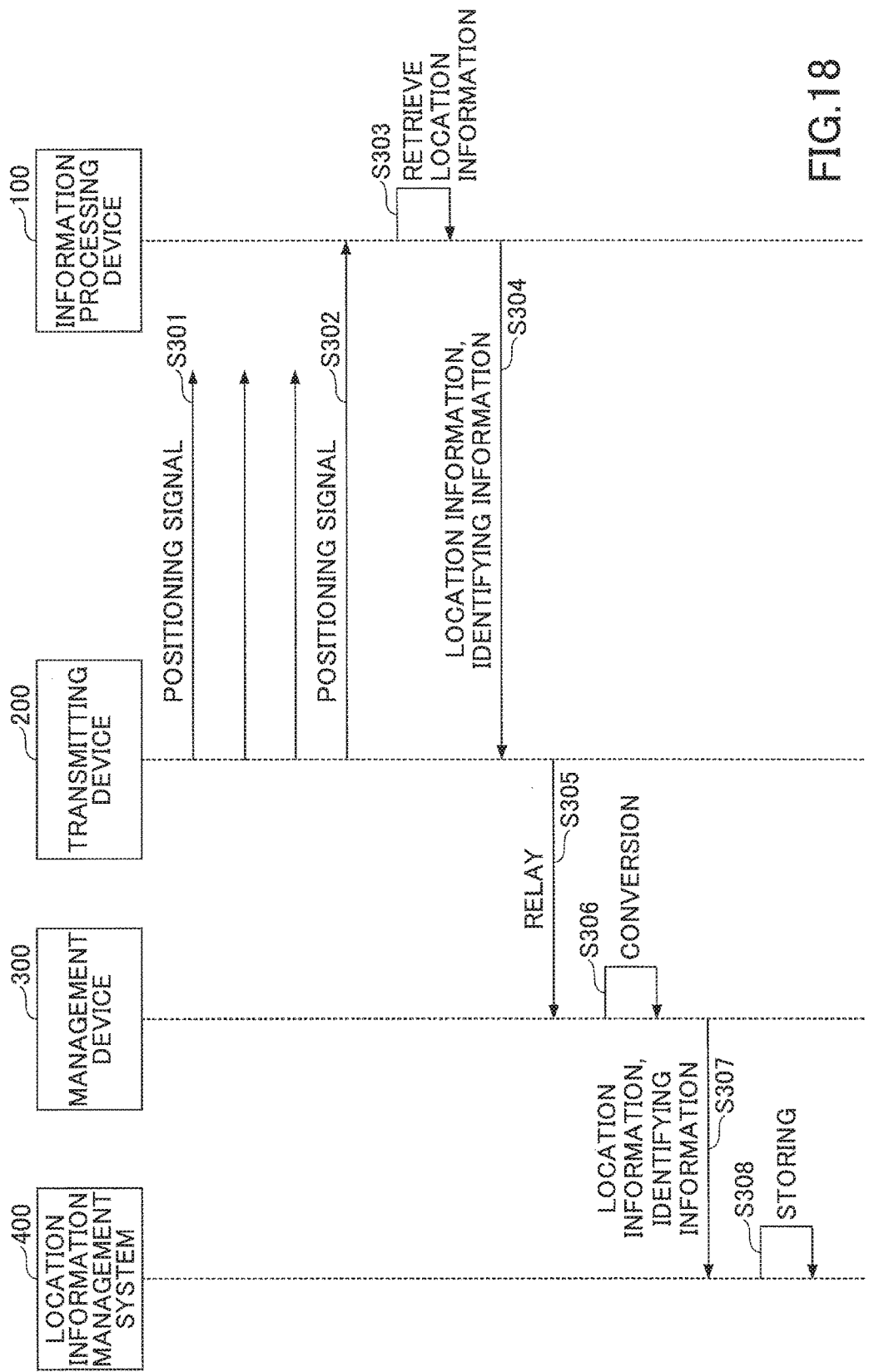
FIG. 18 is a sequence diagram showing an operation example of the information processing device or the like according to the embodiment of the present invention.

Next, there is explained an operation example of the information processing system 1 according to the embodiment of the present invention by referring to FIGS. 16-18. In the following explanation, processing of the system is divided into a route calculation process and a location information management process.

(4.1 Route Calculation Process)

FIG. 16 is a flowchart representing a processing flow of the information processing device 100 according to the embodiment of the present invention.

First, the input reception unit 103 receives an input indicating a destination from a user (step S101). By this input, location information (information on latitude, longitude and a floor) of the destination is identified. When a user inputs a name of a destination or the like, the information delivery system 500 delivers location information corresponding to the name of the destination.

Next, the positioning signal receiver 101 receives a positioning signal transmitted by the positioning signal transmitting unit 202 of the transmitting device 200 (step S102).

Next, the location information retrieval unit 102 retrieves location information (information on the latitude, the longitude, the floor, and a means for transportation) from the positioning signal received at step S102 (step S103). This location information is the location information representing the current location of the information processing device 100. The location information representing the current location of the information processing device 100 may be obtained by a process using the location information retrieved from the positioning signal.

Subsequently, the map information retrieval unit 104 retrieves map information that is required for calculating a route from the map information providing unit 501 (step S104). Here, when the information on the means of transportation that is included in the location information obtained at step S103 indicates that the information processing device 100 is moving, the process proceeds to step S107. Otherwise, the process proceeds to step S106.

When the information on the means of transportation does not indicate that the information processing device 100 is moving (NO at step S105), the route calculation unit 106 calculates a route from the current location that is obtained at step S103 to the destination that is input at step S101 (step S106). As explained by referring to FIG. 14, the route is calculated by using the current location and floor information of the destination.

When the information on the means of transportation indicates that the information processing device 100 is moving by utilizing the means of transportation. (YES at S105), the route calculation unit 106 identifies a station that is the closest to the destination by considering a route (e.g., a line of a railroad company) of the means of transportation (step S107). The route from the current location to the station that is the closest to the destination can be calculated by an existing route calculation algorithm.

Next, the map information retrieval unit 104 retrieves map information of a building of the closest station that is identified at step S107 (step S108).

Next, the route calculation unit 106 calculates a route from the closest station to the destination by using the map information that is retrieved at step S109. As explained by referring to FIG. 15, the route is calculated by using map information of the building of the closest station and map information of a building of the destination (step S109).

Then the display unit 107 displays the calculated route from the current location to the destination (step S110).

FIG. 17 is a sequence diagram showing an operation example by the information processing device 100, the transmitting device 200, and the information delivery system 500 according to the embodiment of the present invention. Here, the operation example is explained by using the example that is explained by using FIG. 15. Namely, when a user of the information processing device 100 is moving by utilizing a D train line of a railroad company A, the user causes the information processing device 100 to display a route while setting Shop A in the north building (the central area on the third floor of the north building) as a destination.

First, the input reception unit 103 of the information processing device 100 receives an input of the destination from the user (step S201). Here, it is assumed that the name of the destination, that is "Shop A in the north building," is input by the user.

Next, the input reception unit 103 of the information processing device 100 retrieves location information corresponding to the name of the destination that is input at step S201 from the destination information providing unit 502 of the information delivery system 500 (step S202).

Next, the input reception unit 103 of the information processing device 100 sends the location information of the destination that is retrieved at step S202 to the route calculation unit 106 (step S203).

Next, the positioning signal receiver 101 of the information processing device 100 receives a positioning signal that is transmitted from the positioning signal transmitting unit 202 of the transmitting device 200 (step S204).

Next, the location information retrieval unit 102 of the information processing device 100 reads the positioning signal retrieved at step S204 (step S205).

Next, the location information retrieval unit 102 of the information processing device 100 retrieves location information (information on latitude, longitude and a floor, and information on a means of transportation) indicating the current location of the information processing device 100 from the positioning signal received at step S204 (step S206). Here, it is assumed, in particular, that the information on the means of transportation indicates that the information processing device 100 is moving by utilizing a B train line of a railroad company A.

Next, the location information retrieval unit 102 of the information processing device 100 sends the location information that is retrieved at step S206 to the route calculation unit 106 (step S207).

Next, the route calculation unit 106 of the information processing device 100 instructs the map information retrieval unit 104 to retrieve map information including information on roads within a certain area that includes the current location and the destination and information on lines and stations of the means of transportation (step S208).

Next, the map information retrieval unit 104 of the information processing device retrieves map information from the map information providing unit 501 of the information delivery system 500 (step S209).

Next, the map information retrieval unit 104 of the information processing device 100 sends the map information retrieved at step S209 to the route calculation unit 106 (step S210).

Next, the route calculation unit 106 of the information processing device 100 identifies a station that is the closest to the destination by using the map information retrieved at step S210 (step S211). Here, it is assumed that the station that is the closest to the destination is identified to be "A station."

Next, the route calculation unit 106 of the information processing device instructs the map information retrieval unit 104 to retrieve map information of all the floors of the building of the A station that is the closest station (step S212).

Next, the map information retrieval unit 104 of the information processing device 100 retrieves the map information of all the floors of the building of the A station from the map information providing unit 501 of the information delivery system 500 (step S213).

Next, the map information retrieval unit 104 of the information processing device 100 sends the map information that is retrieved at step S213 to the route calculation unit 106 (step S214).

Next, the route calculation unit 106 of the information processing device 100 calculates a route from a connection path. (to the A station) within the building of the A station to the destination by the procedure that is explained by referring to FIG. 15 (step S215). In addition, a route from the current location on the B train line of a railroad company A that is retrieved at step S206 to the A station is calculated by using an existing technique, such as a technique for guiding transfer of trains (change of routes).

Next, the route calculation unit 106 of the information processing device 100 instructs the display unit 107 to display the route that is calculated at step S215 (step S216).

Then the display unit 107 of the information processing device 100 displays the route that is calculated at step S215 on a map (S217).

By the above-described processes, and by using the information provided inside the means of transportation and the floor information of the destination, the information processing device 100 according to the embodiment can effectively calculate a route within a building.

(4.2 Location Information Retrieval Processing)

Next, there is explained a process, by the location information management system 400, of retrieving location information of the information processing device 100 through the radio network by referring to FIG. 18. Here, an example is explained such that the information processing device 100 receives a positioning signal including the location information (the latitude=35.66615; the longitude 139.76515; and the floor=2) from the transmitting device 200. At step S301, the positioning signal transmitting unit 202 of the transmitting device 200 continues to send the positioning signal including the above-described location information.

At step S302, the positioning signal receiver 101 of the information processing device 100 receives the positioning signal that is transmitted at step S301.

At step S303, the location information retrieval unit 102 of the information processing device 100 retrieves the location information included in the positioning signal that is received at step S302. The location information is included in predetermined positions of a frame. The frame is defined in accordance with the IMES standard (FIG. 13), for example. At step S304, the location information transmitting unit 108 of the information processing device 100 transmits the above-described location information together with the identifying information of the information processing device 100 to the transmitting device 200 through the radio network. Here, the identifying information of the information processing device 100 is as follows: "012345abcdef." At step S305, the relay unit 203 of the transmitting device 200 relays the location information and the identifying information that are received from the information processing device 100 to the management device 300.

At step S306, the converter 301 of the management system 300 converts communication data that is transmitted from the radio network, to which the transmitting device 200 belongs, into data having a format that conforms to the network, to which the location information management system 400 is connected.

At step S307, the location information receiver 401 of the location information management system 400 receives the location information and the identifying information of the information processing device 100 that are transmitted through the transmitting device 200 and the management device 300.

At step S308, the location information storage unit 402 of the location information management system 400 stores the location information and the identifying information that are received at step S307. FIG. 11 shows an example of a table for storing the location information of the information processing device 100.

By the above-described processes, in the information processing system 1 according to the embodiment, the current location of the information processing device 100 can be managed in real time.

(5. Application Example)

Hereinafter, there is explained the information processing system 1 that can calculate the most efficient route for a case in which a plurality of connecting paths (which are referred to as "floor connecting paths" below) that connect different floors are available, such as a stairway and an elevator.

Figure 19:
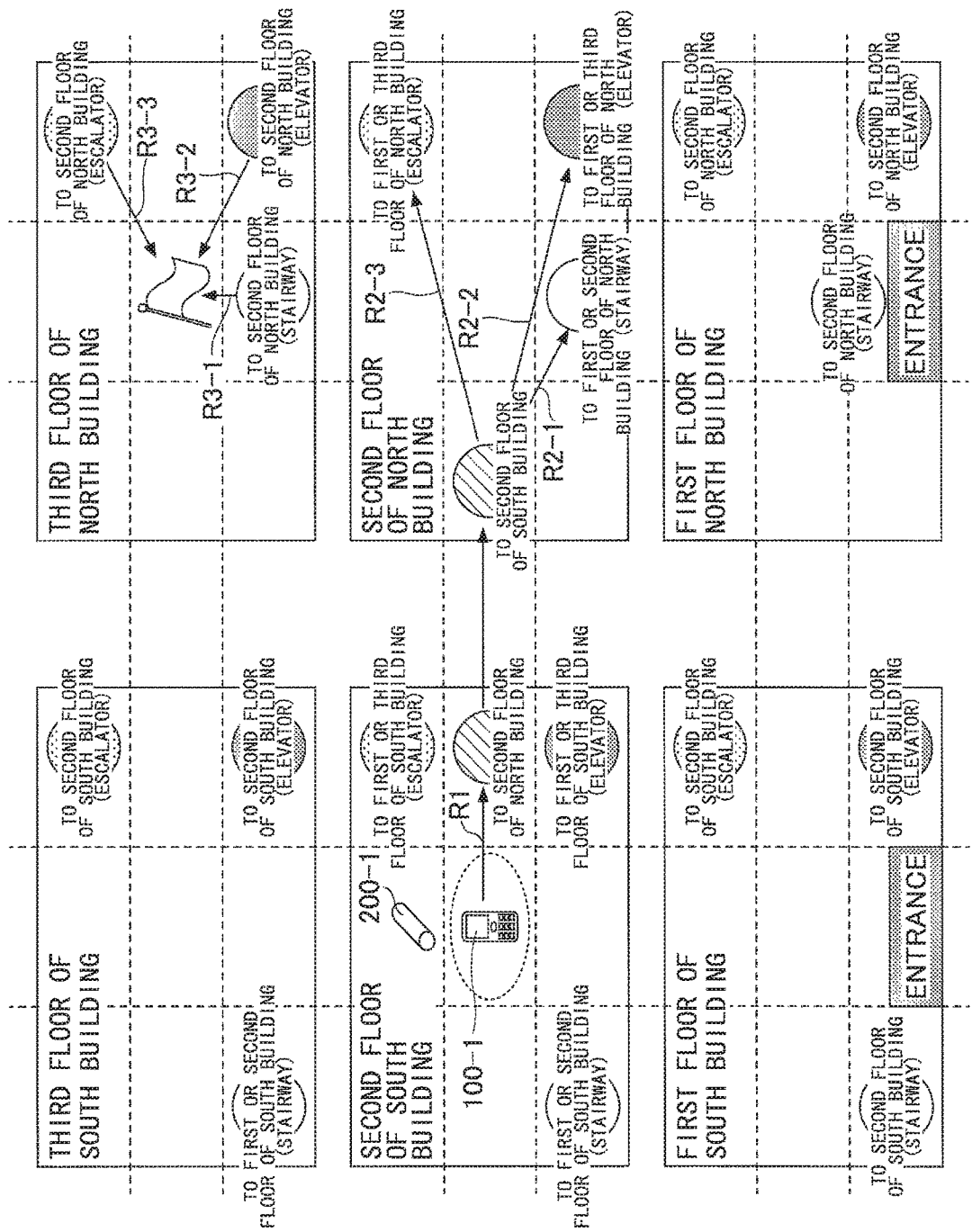
FIG. 19 is a diagram showing an example of a method of calculating a route.

FIG. 19 is a diagram illustrating a method of calculating a route within a building that includes a north building and a south building, similar to the case of FIG. 14, In FIG. 19, unlike FIG. 14, two or more floor connecting paths (a stairway, an elevator and an escalator) are included inside each building. In the example of FIG. 19, for each of the floor connecting paths (namely, the stairway, the elevator and the escalator), there exists a corresponding route from a point on the second floor of the north building that is located near the skybridge (to the south building) to the third floor of the north building where the destination is located. In such a case, the information processing system 1 that is explained in the example below calculates routes for the cases in which the corresponding floor connecting paths are used, and the information processing system 1 selects the most efficient route for a user to reach the destination.

Figure 20:
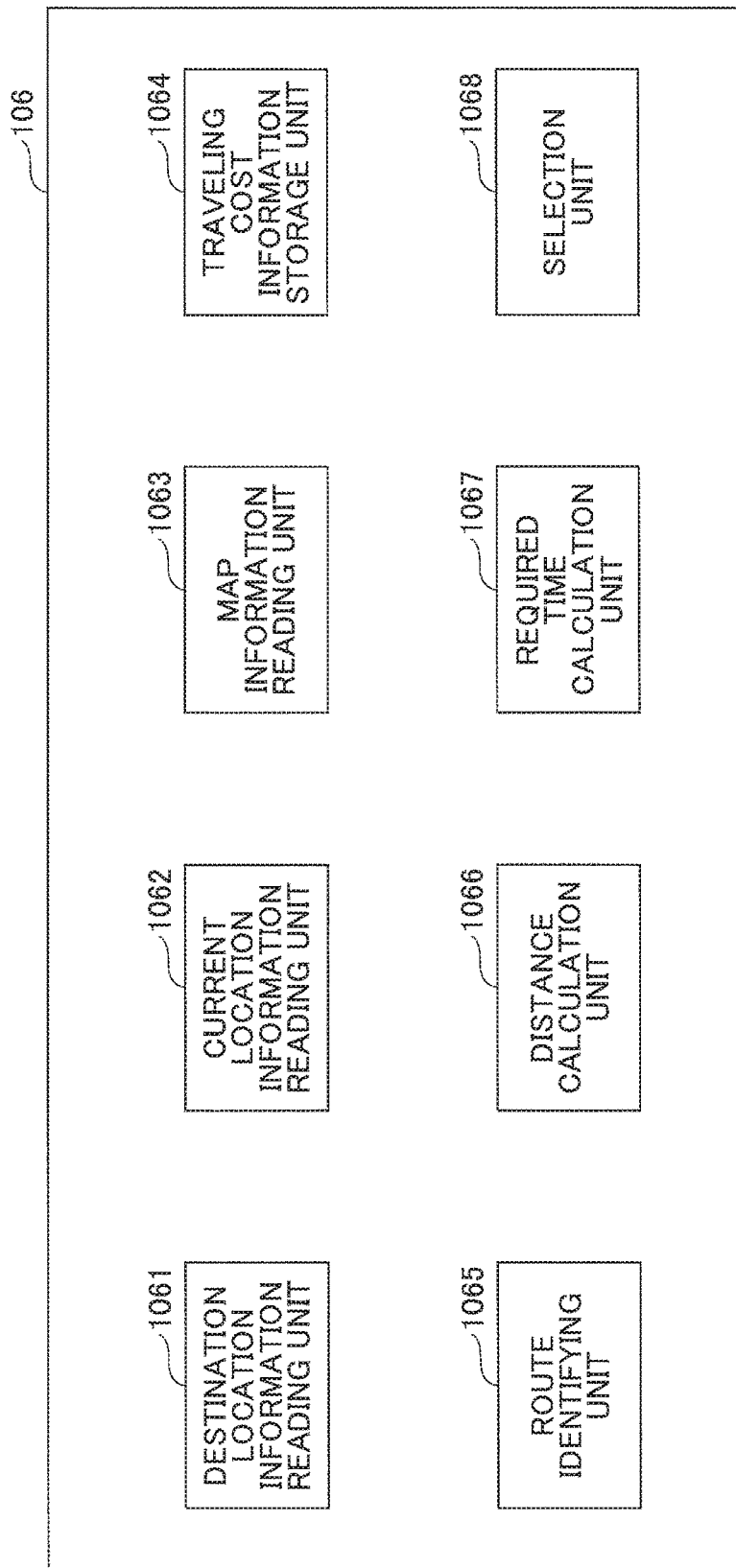
FIG. 20 is a detailed functional block diagram of an example of the information processing device according to the embodiment of the present invention.

FIG. 20 is a functional block diagram illustrating details of the route calculation unit 106 of the information processing device 100 that is explained by referring to FIG. 9. The route calculation unit includes a destination location information reading unit 1061, a current location information reading unit 1062, a map information reading unit 1063, a traveling cost information storage unit 1064, a route identifying unit 1065, a distance calculation unit 1066, a required time calculation unit 1067, and a selection unit 1068.

The destination location information reading unit 1061 reads destination information (information on latitude, longitude and a floor) indicating the destination that is input by a user and received by the input reception unit 103.

The current location information reading unit 1062 may read current location information (information on latitude, longitude and floor, and information on a means of transportation) indicating the current location of the information processing device 100 that is retrieved by the location information retrieval unit 102.

The map information reading unit 1063 may read map information retrieved by the map information retrieval unit 104. Here, the map information may be required for calculating a route.

The traveling cost information storage unit 1064 may define correspondence between the floor connecting paths and the traveling costs. The traveling cost information storage unit 1064 may store the floor connecting paths, such as a stairway, an elevator and an escalator, and the corresponding traveling costs. FIG. 21 shows an example of a table that defines correspondence between the floor connecting paths and the traveling costs and that stores the floor connecting paths and the corresponding traveling costs. The traveling cost represents a cost for traveling one floor when the corresponding floor connecting path is used. The traveling cost may be represented by using any unit. Here, the traveling cost represents a time period (seconds) required for traveling one floor. Traveling one floor means a time period required for traveling from the current floor to either the upper floor or the lower floor, such as traveling from the second floor to the third floor or from the fourth floor to the third floor.

The route identifying unit 1065 may identify a route inside the building from the current location to the destination by using the destination information, the current location information and the map information. As explained by referring to FIG. 14, the route identifying unit 1065 may identify, for each of the floors, a route for reaching the destination.

Additionally, when there exists two or more floor connecting paths within the same floor, the route identifying unit 1065 may identify all the routes. In this case, the route identifying unit 1065 may instruct the distance calculation unit 1066 to calculate distances for the corresponding routes.

When the route identifying unit 1065 identifies two or more routes, the distance calculation unit 1066 may calculate traveling distances for the corresponding routes. The distance calculation unit 1066 may calculate the traveling distances for each floor by using the current location, the destination, and/or latitude and longitude that indicate the location of each floor connecting path. The distance calculation unit 1066 may calculate the traveling distances for each floor by using position coordinates of the corresponding floor connecting paths that are included in the map information for each floor, such as shown in FIGS. 22 and 23. The position coordinates of the floor connecting path may include, for example, coordinates of one end (a start point) of the floor connecting path and coordinates of the other end (an end point) of the floor connecting path.

The required time calculation unit 1067 calculates time periods for passing through the corresponding routes by using the distances of the corresponding routes that are calculated by the distance calculation unit 1066 and walking speed of a user that is specified in advance. The walking speed of the user may be specified by the user in advance, or a generic value, such as 4 km/hour may be used.

The required time calculation unit 1067 may consider the traveling costs for the corresponding floor connecting paths that are stored in the traveling cost information storage unit 1064. The traveling costs shown in FIG. 21 show time periods that are required for traveling one floor when the corresponding floor connecting paths are used. Accordingly, the required time calculation unit 1067 may calculate a total required time period for the user to reach the destination by calculating a total of the time period corresponding to the actual traveling distance on each floor and the traveling time period that is required for using the floor connecting path.

The selection unit 1068 may select the route for which the required time period that is calculated by the required time calculation unit 1067 is the minimum, and the selection unit 1068 causes the display unit 107 to display the selected route.

(Operation Example)

Figure 24:
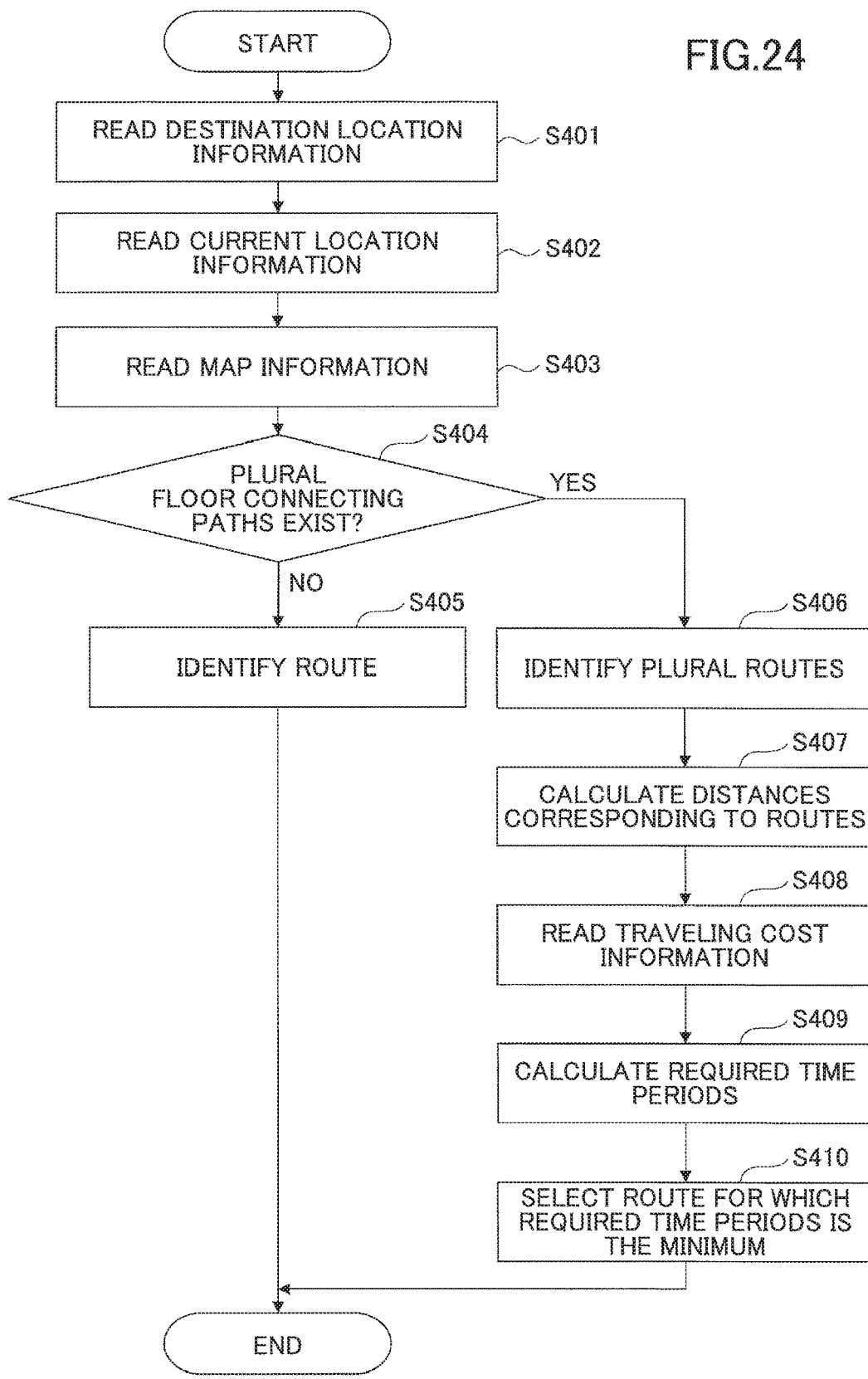
FIG. 24 is a flowchart showing an example of a processing flow of the information processing device according to the embodiment of the present invention.

FIG. 24 is a flowchart showing a processing flow of the above-described route calculation unit 106.

First, the destination location information reading unit 1061 reads the destination information (information on latitude, longitude and a floor) that indicates the destination input by the user and received by the input reception unit 103 (step S401). Next, the current location information reading unit 1062 reads the current location information (information on latitude, longitude and a floor, and information on a means of transportation) representing the current location of the information processing device 100 that is retrieved by the location information retrieval unit 102 (step S402). Further, the map information reading unit 1063 reads map information that is retrieved by the map information retrieval unit 104 and that is required for calculating a route (step S403).

Next, the route identifying unit 1065 determines whether the read map information includes a plurality of floor connecting paths (step S404). When the read map information does not include a plurality of floor connecting paths, namely, when the map information includes only one floor connecting path (step S404, NO), the route identifying unit 1065 identifies the route that uses the floor connecting path (step S405).

When the read map information includes a plurality of floor connecting paths (step S404, YES), the route identifying unit 1065 identifies a plurality of routes using the corresponding floor connecting paths (step S406). For example, in FIG. 19, when the current location is a point on the second floor of the south building where the information processing device 100-1 is located and the destination is the Shop A in the north building that is on the third floor of the north building, the route identifying unit 1065 identifies three routes from the second floor of the south building to the third floor of the north building that correspond to the three floor connecting paths. Namely, the route identifying unit 1065 identifies three routes that are a route including R2-1 and R3-1, a route including R2-2 and R3-2 and a route including R2-3 and R3-3.

Next, the distance calculation unit 1066 calculates traveling distances for the corresponding routes based on the current location information, the destination location information and the location information of the floor connecting paths (FIGS. 22 and 23) by using the latitude and longitude. Next, the required time calculation unit 1067 reads the traveling costs that are stored in the traveling cost information storage unit 1064 (step S408). Next, the required time calculation unit 1067 calculates total required time periods for the corresponding routes by dividing the distances of the corresponding routes by the walking speed of the user that is specified by the user in advance, and by adding the corresponding traveling costs that are read at step S408 to the resultant values (step S409). Then, the selection unit 1068 selects the route for which the required time period is the minimum (step S410).

Figure 25:
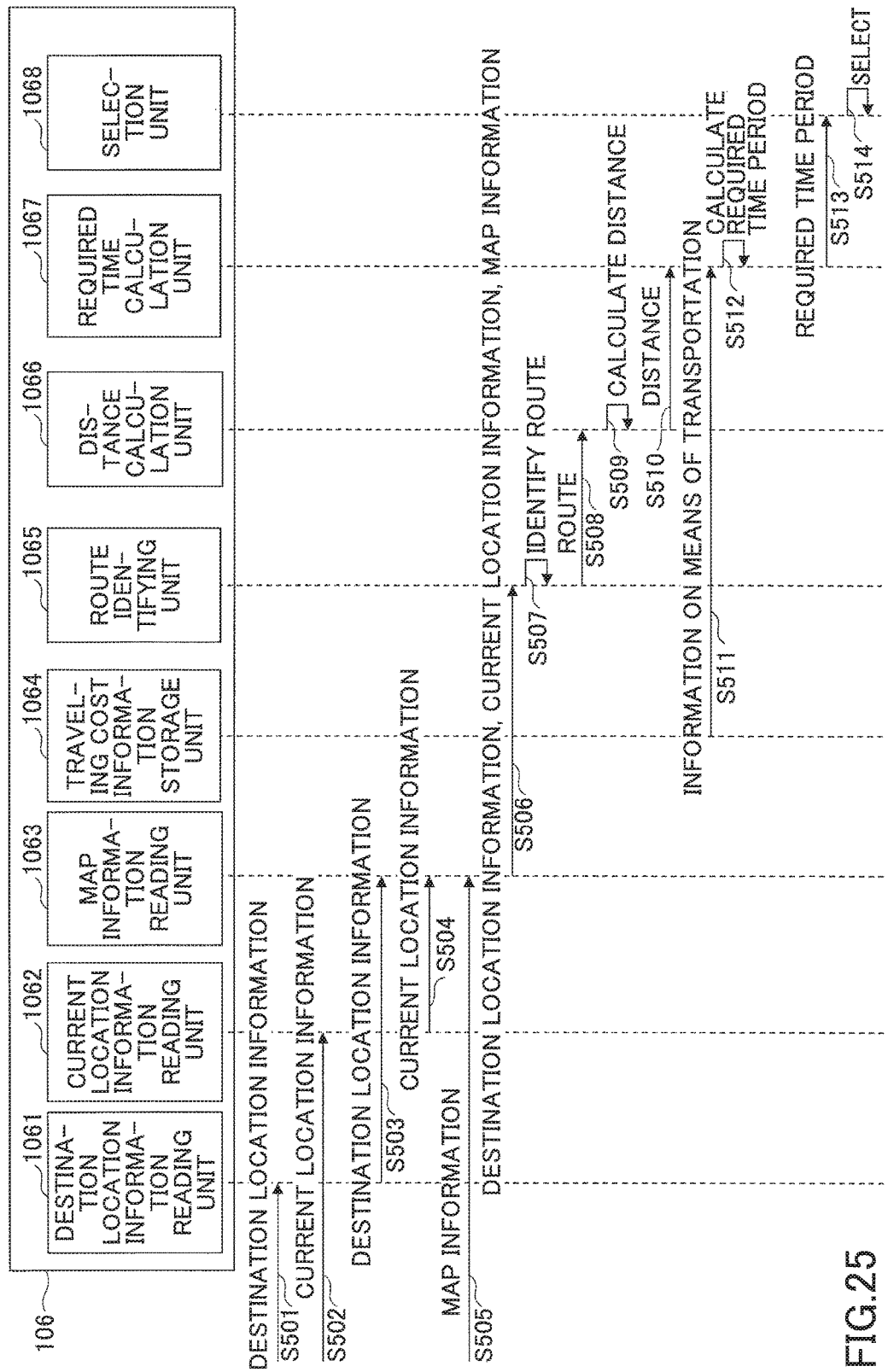
FIG. 25 is a sequence diagram showing an operation example of the information processing device according to the embodiment of the present invention.

FIG. 25 is a sequence diagram that shows a specific operation example of the above-described route calculation unit 106. The operation example of FIG. 25 is explained by using the example that is shown in FIG. 19. In the example of FIG. 19, a user located at a point on the second floor of the south building (the latitude=35.66615, the longitude=139.76515, the floor=2) sets Shop A in the north building (the latitude=35.6665, the longitude=139.76515, the floor=3) as a destination and searches for a route. As shown in FIG. 19, there are three types of floor connecting paths (the stairway, the elevator and the escalator) between the second floor of the north building and the third floor of the north building.

As shown in steps S201-S207 of FIG. 17, first, location information representing the user's current location and destination information are obtained. In response to this, the destination location information reading unit 1061 reads the destination location information (the latitude=35.6665, the longitude 139.76515, the floor=3) (step S501). Next, the current location information reading unit 1062 reads the current location information (the latitude=36.66615, the longitude=139.76515, the floor=2) (step S502).

Next, the map information reading unit 1063 receives the destination location information from the destination location information reading unit 1061 (step S503). Next, the map information reading unit 1063 receives the current location information from the current location information reading unit 1062 (step S504). Next, the map information reading unit 1063 retrieves map information of all the floors of the building including the current location and the destination (step S505). The map information reading unit 1063 reads map information of the second floor of the north building that is shown in FIG. 22 and map information of the third floor of the north building that is shown in FIG. 23, for example. Here, the operation example is explained by using the example in which the building including the current location and the other building that includes the destination are connected within the buildings. For the case where these buildings are not connected, map information of the ground and the underground between these buildings may also be retrieved.

Next, the route identifying unit 1065 receives the destination location information, the current location information and the map information from the map information reading unit 1063 (step S506). As shown in FIG. 21, since the map information includes the three floor connecting paths (the stairway, the elevator and the escalator), the route identifying unit 1065 identifies three routes that use the corresponding three floor connecting paths (step S507). For example, the route identifying unit 1065 can identify the three routes (route 1 to route 3) as shown in FIG. 6 The route identifying unit 1065 sends the information on the identified routes to the distance calculation unit 1066 (step S508).

Next, the distance calculation unit 1066 calculates traveling distances corresponding to the routes (step S509). For example, for the route R1 included in the route 1, the distance calculation unit 1066 calculates the distance of 0.011 (in unit of kilometer, the distance is rounded off to the nearest meter) by using the the longitude of 35.66615 and the latitude of 139.76515 of the current location and the longitude of 35.66625 and the latitude of 139.76515 of the skybridge of the north building. Similarly, the distance calculation unit 1066 calculates distances of the route R2-1 and the route R3-1, which are the remaining parts of the route 1, by using the map information (FIGS. 22 and 23). The distance calculation unit 1066 adds all the distances. Similarly, the distance calculation unit 1066 calculates distances of the route 2 and the route 3. The distances of these routes are calculated as shown in FIG. 27.

Next, the required time calculation unit 1067 receives the information on the distances that are calculated by the distance calculation unit 1066 (step S510). Next, the required time calculation unit 1067 reads information on the traveling costs (FIG. 21) from the traveling cost information storage unit 1064 (step S511). Next, the required time calculation unit calculates the required time periods for traveling the corresponding routes by using the user's walking speed that is defined in advance (step S512). For example, the required time calculation unit 1067 can calculate the required time periods by using the following formula. Here, it is assumed that the traveling costs are time periods that are required for traveling one floor when the corresponding floor connecting paths are used.

Required time period=(traveling cost)×(number of floors to be traveled)+(the distance)/(the walking speed of the user)

When the user's walking speed is 4 km/hour, the required time periods (seconds) are calculated as shown in FIG. 28. The required time calculation unit 1067 sends the information representing the required time periods for the corresponding routes to the selection unit 1068 (step S513).

The selection unit 1068 selects the route 1 for which the required time period is the minimum (step S514). After that, the display unit 107 can display the route 1 on the display.

In this manner, even if a plurality of floor connecting paths exists, the information processing system 1 according to the embodiment can calculate a route by considering the traveling costs for the corresponding floor connecting paths.

The information processing device, the information processing method and the non-transitory computer readable medium storing a program are explained above by the embodiment. However, the Present invention is not limited to the specifically disclosed embodiment, and variations and modifications may be made within the scope of the present invention. Specific examples of numerical values are used in order to facilitate understanding of the invention. However, these numerical values are simply illustrative, and any other appropriate values may be used, except as indicated otherwise. The separations of the sections of the specification are not essential to the present invention. Depending on necessity, subject matter described in two or more sections may be combined and used, and subject matter described in a section may be applied to subject matter described in another section (provided that they do not contradict). A boundary of a functional unit or a processing unit in a functional block may not correspond to a boundary of a physical component. An operation by a plurality of functional units may be physically executed by a single component. Alternatively, an operation by a single functional unit may be physically executed by a plurality of components.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can comprise any suitable programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Priority Application No. 2013-167348, filed on Aug. 12, 2013 and Japanese Priority Application No. 2014-152726, filed on Jul. 28, 2014, the entire contents of which are hereby incorporated herein by reference.

What is claimed is:

1. An information processing device configured to receive a positioning signal that is transmitted from a transmitting device, the information processing device comprising:
   circuitry configured to
      receive an input of a destination and configured to identify first location information including first floor number information, wherein the first floor number information indicates a floor number of the destination in a structure including the destination;
      retrieve second location information including second floor number information from the positioning signal, wherein the second floor number information indicates a floor number on which the transmitting device is provided in a structure in which the transmitting device is provided; and
      calculate a route from a current location of the information processing device to the destination by using the first location information and the second location information.

2. The information processing device according to claim 1,
   wherein the structure in which the transmitting device is provided includes a means of transportation,
   wherein the second location information includes information indicating use of the means of transportation, and
   wherein, when the information indicating the use of the means of transportation indicates that the means of transportation is being used, the circuitry is configured to calculate the route by using information on a structure that is a destination of the means of transportation.

3. The information processing device according to claim 1,
   wherein the circuitry is configured to calculate the route by using information indicating a connecting path that connects different floors, wherein the information indicating the connection path is included in the first location information and/or the second location information.

4. The information processing device according to claim 3, further comprising:
   a display configured to display the route that is identified by the circuitry,
   wherein the circuitry is configured to calculate a plurality of the routes by using a plurality of the connecting paths that connect the different floors, and the circuitry is further configured to identify a route such that a time period of traveling the route is the minimum among the plurality of the calculated routes.

5. The information processing device according to claim 1,
wherein the positioning signal conforms to an Indoor Messaging System (IMES) standard.

6. The information processing device according to claim 1,
wherein the current location of the information processing device is a position indicated by the second location information.

7. An information processing method to be executed by an information processing device configured to receive a positioning signal that is transmitted from a transmitting device, the method comprising:
receiving an input of a destination and identifying first location information including first floor number information, wherein the first floor number information indicates a floor number of the destination in a structure including the destination;
retrieving second location information including second floor number information from the positioning signal, wherein the second floor number information indicates a floor number on which the transmitting device is provided in a structure in which the transmitting device is provided; and
calculating a route from a current location of the information processing device to the destination by using the first location information and the second location information.

8. A non-transitory computer-readable medium storing a program for causing a computer that is configured to receive a positioning signal transmitted from a transmitting device to execute:
receiving an input of a destination and identifying first location information including first floor number information, wherein the first floor number information indicates a floor number of the destination in a structure including the destination;
retrieving second location information including second floor number information from the positioning signal, wherein the second floor number information indicates a floor number on which the transmitting device is provided in a structure in which the transmitting device is provided; and
calculating a route from a current location of the information processing device to the destination by using the first location information and the second location information.

\* \* \* \* \*